United States Patent
McFarland et al.

(10) Patent No.: US 8,104,362 B2
(45) Date of Patent: Jan. 31, 2012

(54) IN-LINE VIRTUAL IMPACTOR

(75) Inventors: Andrew R. McFarland, Houston, TX (US); Satyanarayanan Seshadri, Bangalore (IN)

(73) Assignee: Texas A&M University System, College Station, TX (US)

(*) Notice: Subject to any disclaimer, the term of this patent is extended or adjusted under 35 U.S.C. 154(b) by 490 days.

(21) Appl. No.: 12/349,837

(22) Filed: Jan. 7, 2009

(65) Prior Publication Data

US 2009/0223279 A1 Sep. 10, 2009

Related U.S. Application Data

(60) Provisional application No. 61/019,744, filed on Jan. 8, 2008.

(51) Int. Cl.
*G01N 1/22* (2006.01)
*B01D 45/04* (2006.01)

(52) U.S. Cl. .......... 73/863.21; 73/863.22; 95/31; 95/32; 209/142; 209/143

(58) Field of Classification Search .......... 55/434, 55/442; 73/863.21, 863.22; 95/31, 32; 209/142, 209/143
See application file for complete search history.

(56) References Cited

U.S. PATENT DOCUMENTS

| | | | |
|---|---|---|---|
| 3,901,798 A | 8/1975 | Peterson | |
| 4,301,002 A | 11/1981 | Loo | |
| 4,767,524 A | 8/1988 | Yeh et al. | |
| 5,183,481 A * | 2/1993 | Felder | 95/29 |
| 5,235,969 A * | 8/1993 | Bellm | 128/200.18 |
| 5,412,975 A * | 5/1995 | Raabe et al. | 73/28.04 |
| 5,788,741 A | 8/1998 | Burton et al. | |
| 5,858,043 A * | 1/1999 | Geise | 55/462 |
| 6,010,554 A * | 1/2000 | Birmingham et al. | 95/32 |
| 6,120,573 A * | 9/2000 | Call et al. | 55/442 |
| 6,156,212 A * | 12/2000 | Rader et al. | 210/788 |
| 6,544,312 B2 * | 4/2003 | Mullinger et al. | 55/434 |
| 6,688,187 B1 * | 2/2004 | Masquelier | 73/863.22 |
| 6,698,592 B2 | 3/2004 | Kenning et al. | |
| 6,973,883 B1 | 12/2005 | Annamalai et al. | |
| 7,178,380 B2 * | 2/2007 | Shekarriz et al. | 73/28.04 |
| 7,232,477 B2 * | 6/2007 | Rodgers | 96/413 |

(Continued)

OTHER PUBLICATIONS

"Sensor Systems for Biological Agents Attacks: Protecting Buildings and Military Bases," Committee on Materials and Manufacturing Processes for Advanced Sensors, National Research Council, 2005 (209 p.).

(Continued)

*Primary Examiner* — David A. Rogers
(74) *Attorney, Agent, or Firm* — Conley Rose, P.C.

(57) ABSTRACT

An inline virtual impactor comprising an outer housing having a housing inlet, a housing inner surface, a major flow outlet and a minor flow outlet; a flow accelerator member disposed in the upstream portion of the outer housing; and a flow stabilizer member disposed within the outer housing downstream of the flow accelerator member, wherein the disposition of the flow accelerator creates an annular flow passage between the flow accelerator and the outer housing, and wherein a flow divider that is at least partially downstream of the flow stabilizer member effects splitting of the flow stream entering the housing into major and minor flows. The minor flow comprises primarily particles having a size greater than a cutpoint size and the major flow comprises primarily particles smaller than the cutpoint size. The inline virtual impactor may further comprise an aspiration section located upstream of the flow accelerator member.

24 Claims, 18 Drawing Sheets

U.S. PATENT DOCUMENTS

| | | | |
|---|---|---|---|
| 7,261,007 | B2 | 8/2007 | Haglund et al. |
| 7,591,197 | B2* | 9/2009 | Bell et al. .................... 73/863.21 |
| 2002/0179499 | A1* | 12/2002 | Kenning et al. ................ 209/143 |
| 2003/0052281 | A1* | 3/2003 | Rader et al. ................. 250/461.1 |
| 2003/0110943 | A1* | 6/2003 | Page et al. .......................... 95/62 |
| 2005/0058575 | A1* | 3/2005 | Ishikawa et al. ................ 422/83 |
| 2005/0105079 | A1* | 5/2005 | Pletcher et al. .................. 356/72 |
| 2005/0247868 | A1* | 11/2005 | Call et al. ....................... 250/282 |
| 2006/0054017 | A1 | 3/2006 | Haglund et al. |
| 2006/0080948 | A1* | 4/2006 | Rodgers ........................... 55/434 |
| 2007/0048186 | A1* | 3/2007 | Call et al. ...................... 422/68.1 |
| 2007/0092976 | A1* | 4/2007 | Watson et al. ................. 436/181 |
| 2007/0107539 | A1* | 5/2007 | Bell et al. ..................... 73/863.21 |
| 2007/0269349 | A1* | 11/2007 | Shih et al. ...................... 422/101 |
| 2008/0105034 | A1* | 5/2008 | Parfitt et al. ................... 73/28.06 |
| 2008/0206106 | A1* | 8/2008 | Fernandez de la Mora .... 422/83 |
| 2010/0089183 | A1* | 4/2010 | Solomon .................... 73/863.22 |

OTHER PUBLICATIONS

Product Information Sheet for Model 3306 Impactor Inlet, Aerosol Research, Sep. 14, 2001 (2 p.).

Thompson, M.W., et al., "Method and Test System for Evaluation of Bioaerosol Samplers," J. Aerosol Sci., vol. 25, No. 8, 1579-1593, 1994 (15 p.).

Olan-Figueroa, E., et al., "Flattening Coefficients for DOP and Oleic Acid Droplets Deposited on Treated Glass Slides," American Industrial Hygiene Association Journal, 43:6, 395-399, 1982 (6 p.).

Marple, V.A., et al., "A Mircroorifice Uniform Deposit Impactor (MOUDI): Description, Calibration, and Use," Aerosol Science and Technology, 14:4, 434-446, Jan. 1, 1991 (14 p.).

Loo, B.W., et al., "An Evaluation of the ERC Virtual Impactor," Lawrence Berkeley Laboratory, University of California, Jan. 1974 (28 p.).

Loo, B.W., et al., "Development of High Efficiency Virtual Impactors," Aerosol Science and Technology, 9:3, 167-176, Jan. 1, 1988 (11 p.).

Lee, S.A., "A Slit Impactor Utilizing a Transpirated Impaction Surface for Collection of Bioaerosols," Office of Graduated Studies, Texas A&M University, May 2001 (62 p.).

Kim, H.T., et al., "Design and Test of 2.5 urn Cutoff Size Inlet Based on a Particle Cup Impactor Configuration," Aerosol Science and Technology, 36:136-144, 2002 (10 p.).

Hering, S., et al., "A Microslot Impactor for Organic Aerosol Sampling," J. Aerosol Sci., vol. 28, No. 7, 1283-1290, 1997 (8 p.).

Hari, S., et al., "Computational Fluid Dynamics Simulation of a Rectangular Slit Real Impactor's Performance," Nuclear Engineering and Design 235, 1015-1028, 2005 (14 p.).

Haglund, J.S., et al., "A Circumferential Slot Virtual Impactor," Aerosol Science and Technology, 38:664-674, 2004 (12 p.).

Dzubay, T.G., et al., "Ambient Air Analysis with Dichotomous Sampler and X-ray Fluorescence Spectrometer," Environ. Sci. Technol., 9(7), 663-668, 1975 (7 p.).

Ding, Y., et al., "Development of a High Volume Slit Nozzle Virtual Impactor to Concentrate Coarse Particles," Aerosol Science and Technology 34:274-283, Mar. 1, 2001 (11 p.).

Chen, B.T., et al., "A Study of Density Effect and Droplet Deformation in the TSI Aerodynamic Particle Sizer," Aerosol Science and Technology, 12:278-285, Jan. 1, 1990 (9 p.).

Biswas, P., et al., "The Particle Trap Impactor," J. Aerosol Sci., vol. 19, No. 1, 113-121, 1988 (9 p.).

Romay, F.J., et al., "A High-Performance Aerosol Concentrator for Biological Agent Detection," Aerosol Science and Technology, 36:217-226, Feb. 1, 2002 (11 p.).

International Search Report and Written Opinion dated Sep. 28, 2009 issued in corresponding Application No. PCT/US2009/030324, 11 pages.

* cited by examiner

IN-LINE VIRTUAL IMPACTOR

CROSS-REFERENCE TO RELATED APPLICATIONS

This application claims the benefit under 35 U.S.C. §119(e) of U.S. Provisional Patent Application Ser. No. 61/019,744 filed Jan. 8, 2008, which is hereby incorporated herein by reference in its entirety.

STATEMENT REGARDING FEDERALLY SPONSORED RESEARCH OR DEVELOPMENT

This invention was made with Government support from the Edgewood Chemical Biological Center of the U.S. Army Research, Development and Engineering Command under Contract No. DAAD13-03-C-0050. The government may have certain rights in this invention.

BACKGROUND

1. Field of Technology

The invention relates generally to devices and methods to fractionate particulate matter into coarse and fine fractions. Applications include aerosol sampling (e.g., removal of large-sized debris from aerosols that are to be analyzed for biological materials) and powder processing (e.g., exclusion of large particles from pharmaceutical powders that are used for inhalation therapy).

2. Background of the Invention

A typical ambient aerosol sampling system includes a pre-separator that is designed to exclude relatively large particles from an aerosol comprising a spectrum of particle sizes. In some applications, the performance of the pre-separator is intended to mimic the human respiratory system by precluding transmission of larger-sized particles through the device. In other applications the pre-separator is used to strip particles that could confound post-separation analyses or could foul near-real time detection systems. For example, in the context of near-real-time bioaerosol sampling, it is generally necessary to strip large pollen particles from the distribution if the aerosol is to be analyzed for fluorescent characteristics.

Most conventional large particle fractionators are inertial separation devices, the simplest type being the classical inertial impactor. Inertial impactors are devices widely used for the sampling and size-selective collection of aerosol particles. The principal of operation for inertial impactors is that an aerosol stream is accelerated in a nozzle and impinges upon a collection surface, which is separated from the nozzle by an air gap. Particles in the aerosol stream having sufficiently high inertia will impact upon the collection surface while the other particles will follow the airflow out of the impaction region. For an impactor used as a pre-separator, the cutpoint particle size is usually defined as the aerodynamic particle diameter (AD) for which 50% of the cutpoint particles flow out of the impaction region with the air. This aerosol is referred to as the fine fraction. The ideal efficiency curve, which is the transmission efficiency as a function of particle size, is a unit step function at the cutpoint size. That is, all particles below the cutpoint size leave with the air in the fine fraction, while all particles above the cutpoint size are deposited on the collection surface or, inadvertently, on other internal surfaces.

In a conventional impactor-type pre-separator, to reduce undesirable large particle carryover due to particle rebound or re-entrainment from the collection surface, the particle collection surface is often coated with a layer of oil or grease that helps retain such larger particles. However, when the concentration of larger particles in the aerosol is relatively high, an oiled or greased surface may not provide sufficient large particle retention because the rate of dust accumulation on the surface may occur at a faster rate than the oil can be transported through the dust layer to the surface. An additional problem with oil- or grease-coated collection surfaces it that fibrous particles in the collected deposits will cause inadvertent collection of particles from the fine fraction. Frequent maintenance is typically needed to clean the collection surfaces of real impactors to reduce the collection of fine-fraction particles by previously deposited fibrous materials and provide sufficient coarse particle retention on the collection plate.

As an alternative to classical inertial impactors, virtual impactors may be used to fractionate an aerosol into coarse and fine fractions. If a suitably shaped collection surface, at the location where the particles would impact in a real impactor, has an opening through which large particles may pass, and if a small amount of transport air is used to convey the large particles away from the opening, a "virtual impactor" can be created. Coarse particles enter the opening with the minor flow while the fine particle flow, i.e. the major flow, is separated therefrom. Thus, particles with a size above the cutpoint (together with the small particles in the transport air) are conducted away by the minor flow stream of gas leaving a size distribution of the fine particle flow that is scalped of large particles. In this way, virtual impactors tend to minimize large particle carryover relative to the undesirable large particle carryover that can result with the use of real impactors.

Although the present invention is primarily focused on the fine particle fraction in the major flow, a virtual impactor concentrates the coarse particle fraction and in many applications, the coarse fraction is of interest. The coarse particle fraction leaves the virtual impactor with an air flow (minor flow) that is reduced in volume compared with the air flow that approached the "virtual collection surface."

Typically, the slope of the transmission efficiency curve of a virtual impactor is not as steep as that of a real impactor, i.e., the transmission efficiency of the real impactor more closely approximates that of an ideal transmission efficiency curve. On the other hand, the large-particle fractionation characteristics of the human respiratory system are more closely approximated by a virtual impactor than by a real impactor.

Virtual impactor geometry tends to be complex. For example, correct alignment of the acceleration nozzle with respect to the nozzle that receives the coarse particles (minor flow) and the nozzle that receives the fine particles (major flow) is critical to flow stability and performance, but difficult to consistently achieve. Consequently, most large particle fractionators still employ some form of a real impactor.

Accordingly, there remains a need in the art for improved devices and methods for fractionating aerosol particles in applications such as bioaerosol sampling and production of pharmaceutical powders.

SUMMARY

Herein disclosed is an inline virtual impactor comprising: an outer housing having a housing inlet, a housing inner surface, a major flow outlet and a minor flow outlet; a flow accelerator member disposed in the upstream portion of the outer housing; and a flow stabilizer member disposed within the outer housing downstream of the flow accelerator member, wherein the disposition of the flow accelerator within the outer housing creates an annular flow passage between the flow accelerator and the outer housing, and wherein the inline virtual impactor is operable to separate a particle stream entering the housing inlet into a minor flow comprising primarily particles having a size greater than a cutpoint size and a major flow comprising primarily particles smaller than the cutpoint size.

The outer housing may comprise a substantially cylindrical tube having a tube central axis and an inner cylindrical surface.

In some embodiments, the flow accelerator member comprises an upstream apex pointing toward the housing inlet, a downstream base opposite the upstream apex, and an accelerator member central axis; wherein the downstream base is perpendicular to the accelerator central axis. The accelerator central axis and the tube central axis may be coincident. The flow accelerator member may taper inward from the downstream base to the upstream apex. In specific embodiments, the flow accelerator member is a cone. The cone may have a frustoconical outer surface and an upstream apex angle. In embodiments, the upstream apex angle is about 60°. The annular flow passage may have a radial width that decreases with longitudinal position from the upstream apex to the downstream base. In alternative embodiments, the flow accelerator member comprises a bullet-shaped object.

The flow stabilizer member of the disclosed inline virtual impactor may comprise a stabilizer apex, a stabilizer base, an outer surface, and a stabilizer central axis; wherein the stabilizer base is perpendicular to the stabilizer central axis and the stabilizer apex is downstream of the stabilizer base and points away from the housing inlet. In certain embodiments, the stabilizer central axis, the accelerator central axis, and the housing central axis are coincident.

The flow stabilizer member may substantially taper inward from the stabilizer base to the stabilizer apex. In specific embodiments, the stabilizer apex angle is about 90°. In some embodiments, the flow stabilizer member is a cone. In embodiments, the stabilizer base and the accelerator base are the same base, and the flow stabilizer member and the flow accelerator member define a dual cone.

In embodiments, the inline virtual impactor of this disclosure further comprises a flow divider disposed within the outer housing substantially downstream of the flow stabilizer member. In embodiments, the flow divider comprises an inner surface facing but spaced axially apart from the flow stabilizer outer surface, a flow divider central axis, and a flow divider outer surface facing but spaced radially apart from the housing inner surface. Such an inline virtual impactor may further comprise at least one alignment spacer positioned between the flow stabilizer member and the flow divider. The flow divider central axis, the accelerator central axis, the housing central axis, and the stabilizer central axis may be coincident.

The inline virtual impactor may further comprise an aspiration section through which an inlet stream to be sampled passes prior to introduction into the inline virtual impactor and wherein particles greater than an inlet removal size are removed from the inlet stream prior to introduction into the inline virtual impactor as the particle stream. In specific embodiments, the aspiration section is substantially bell-shaped and comprises a bell-shaped outer housing comprising a lower inlet end, an inner housing comprising a lower inlet end; wherein the bell-shaped outer housing is spaced apart from the inner housing to define an inlet flow channel, and wherein the inlet flow channel is fluidly connected with an inner cavity disposed axially below an aspiration section cover. The aspiration section may further comprise a screen for the collection of particles greater than the inlet removal size.

The inline virtual impactor of may have a cutpoint particle size of about 11 µm±3 µm AD. The inline virtual impactor may have a cutpoint Stokes number of between about 0.5 and about 1.1. The cutpoint Stokes number may be about 0.7 when the ratio of major flow rate to minor flow rate is about 9:1 and the aspect ratio is about 1.7. In embodiments, the cutpoint Stokes number is between about 0.4 and 0.9 when the percentage of the flow which is minor flow is between about 20% and about 5%.

The inline virtual impactor of this disclosure may further comprise at least one alignment spacer positioned between the flow stabilizer member and the flow divider, and the cutpoint Stokes number may be adjusted by altering the aspect ratio by changing the height of the at least one alignment spacer. In embodiments, the cutpoint Stokes number can be varied from about 0.4 to about 1 when the aspect ratio is varied from about 1 to 1.5 and the ratio of major to minor flow rate is held constant at about 9:1.

The inline virtual impactor may further comprise at least one alignment spacer positioned between the flow stabilizer member and the flow divider. In some embodiments, the cutpoint particle size provided by the inline virtual impactor may be adjusted by changing the height of the at least one alignment spacer.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the invention, reference will now be made to the accompanying drawings in which:

Figure 17:
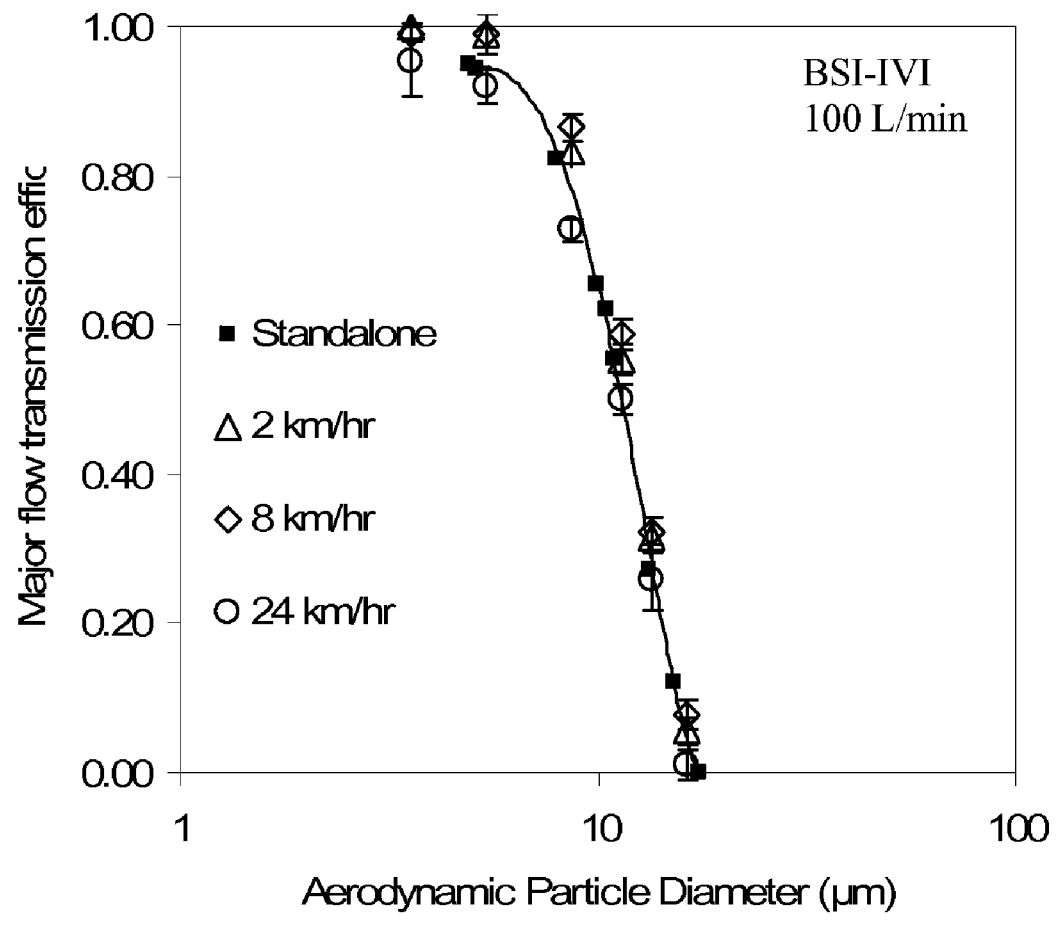

FIG. 17 is a plot of major flow transmission efficiency as a function of aerodynamic particle diameter for an integrated BSI-100/IVI-100 according to an embodiment of the invention. The integrated inlet system was operated in wind speeds of 2, 8, and 24 km/h. For comparison, data for an IVI-100 operated in the stand-alone mode is also shown.

FIG. 18 is a plot of major flow transmission efficiency as a function of aerodynamic particle diameter, showing wind tunnel performance of a BSI-100 integrated with an IVI-400 according to an embodiment of this disclosure.

NOTATION AND NOMENCLATURE

Figures 1A, 1B:
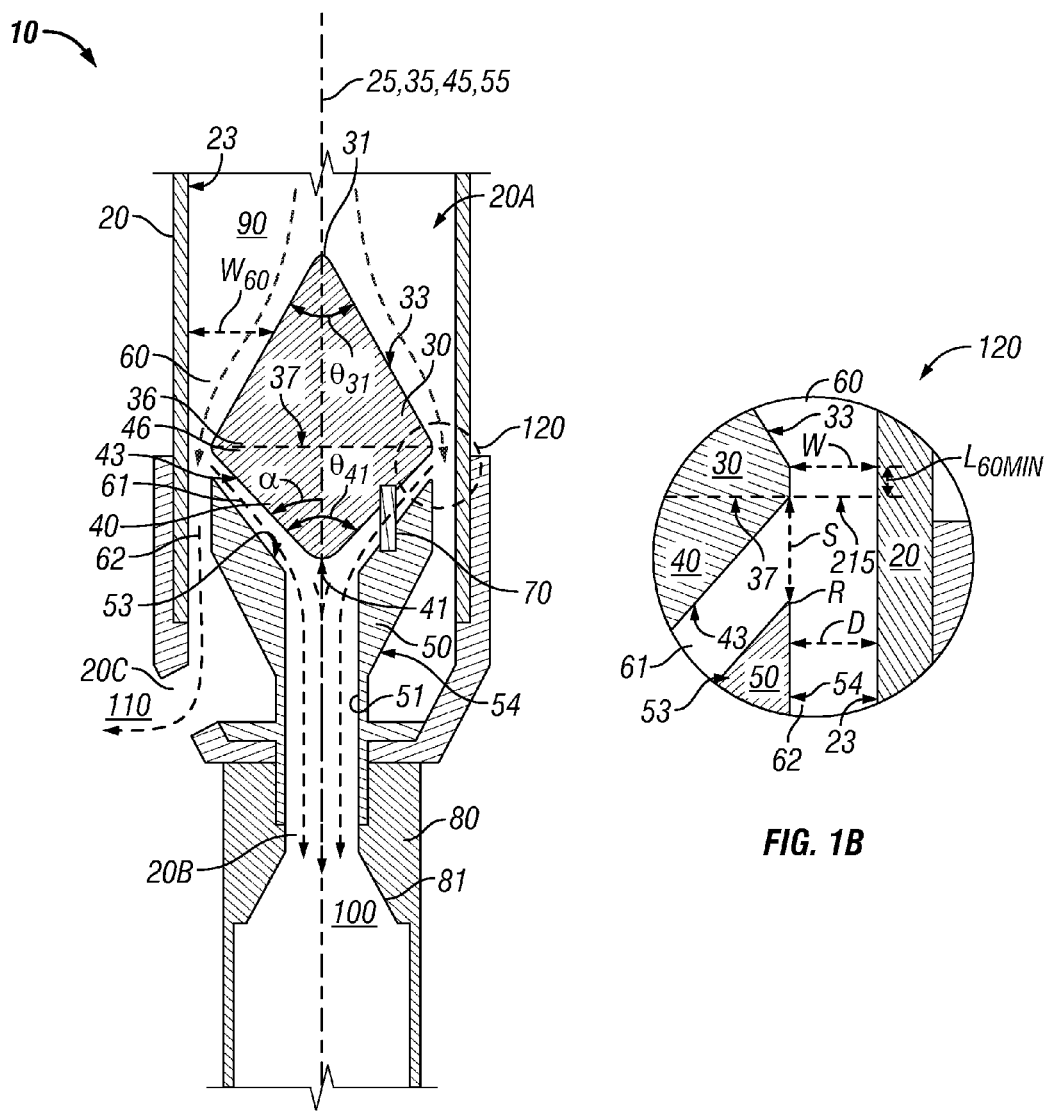
FIG. 1A is a cross-sectional view of an embodiment of an inline virtual impactor (IVI) constructed in accordance with the principles described herein.
FIG. 1B is an expanded view of the critical zone 120 of the inline virtual impactor of FIG. 1A.

Certain terms throughout the following description and claims are used to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In-Line Virtual Impactor (IVI)

Referring now to FIG. 1A, an embodiment of a virtual inline impactor (IVI) 10 constructed in accordance with the principles described herein is shown. IVI 10 comprises an outer housing 20, a flow accelerator member 30, a flow stabilizer member 40, and a flow divider 50. In general, IVI 10 is used to fractionate a bulk inlet aerosol 90 typically comprising air and particulate matter. In particular, IVI 10 separates aerosol 90 into a minor flow 110 comprising relatively larger particles together with relatively smaller particles associated with the minor flow transport air, and a major flow 100 comprising relatively smaller particles.

Housing 20 includes a housing inlet 20A, a major flow outlet 20B for the relatively smaller particles, and a minor flow outlet 20C for the relatively larger separated particles. In this embodiment, housing 20 is generally a cylindrical tubular having a central axis 25 and an inner cylindrical surface 23.

Flow accelerator member 30 is disposed in the upper or upstream portion of housing 20 and comprises an upstream apex 31, a downstream base 36, and a central axis 35. In this embodiment, flow accelerator member 30 is coaxially disposed within housing 20 such that axes 25, 35 are coincident. It should be appreciated that base 36 is disposed in a plane 37 that is substantially perpendicular to axes 25, 35.

Referring still to FIG. 1A, the outer surface 33 of flow accelerator member 30 generally tapers inward moving upstream from base 36 towards apex 31. In this embodiment, flow accelerator member 30 is a cone having a frustoconical outer surface 33 and an apex angle $\theta_{31}$ of about 60°. As a result, an annular flow passage 60 formed between flow accelerator member 30 and outer housing 20 has a radial width $W_{60}$ that narrows or decreases moving downstream towards base 36. Although flow accelerator member 30 is a cone having an apex angle $\theta_{31}$ of about 60° in this embodiment, in other embodiments, the flow accelerator member (e.g., flow accelerator member 30) may comprise other suitable geometries such as bullet shaped and the like.

Narrowing annular flow passage 60 forms a converging nozzle that results in the axial acceleration of bulk inlet airflow 90 between housing inlet 20A and base 36. Consequently, flow passage 60 may also be referred as an "accelerating flow passage." In addition, flow passage 60 tends to channel bulk inlet airflow 90 into a substantially axially oriented flow between housing inlet 20A and base 36. Thus, bulk inlet airflow 90 is axially accelerated between housing inlet 20A and base 36, reaching a maximum velocity at or near at the narrowest portion of annular flow passage 60 located at a critical zone 120 formed between outer surface 33 and inner surface 23 proximal flow stabilizer member 40 and flow divider 50. Consequently, the upper portion of housing 20 and flow accelerator member 30 may also be referred to as a "flow acceleration assembly."

Referring still to FIG. 1A, flow stabilizer member 40 is disposed within housing 20 downstream of flow accelerator member 30. Flow stabilizer member 40 comprises a lower or downstream apex 41, an upper or upstream base 46, and a central axis 45. In this embodiment, flow stabilizer member 40 is coaxially disposed within housing 20 such that axes 25, 35, 45 are coincident.

The outer surface 43 of flow stabilizer member 40 generally tapers inward moving downstream from base 46 towards apex 41. In this embodiment, flow stabilizer member 40 is a cone having a frustoconical outer surface 43 and an apex angle $\theta_{41}$ of about 90°. Although flow stabilizer member 40 is a cone having an apex angle $\theta_{41}$ of about 90° in this embodiment, in other embodiments, the flow stabilizer member (e.g., flow stabilizer member 40) may comprise other suitable geometries such as bullet shaped and the like. As will be described in more detail below, flow stabilizer member 40 serves to create a stable (non-transient) major flow 100.

In this embodiment, flow accelerator member 30 and flow stabilizer member 40 are integral, with bases 36, 46 connected together or identical and apexes 31, 41 generally oriented 180° apart. Further, since flow accelerator member 30 and flow stabilizer member 40 are each cones in this embodiment, collectively, they may be referred to as a "dual cone."

Referring still to FIG. 1A, flow divider 50 is disposed within housing 20 generally downstream of flow stabilizer member 40. Flow divider 50 has a central axis 55, an inner surface 53 facing, but axially spaced apart from, surface 43, and an outer surface 54 facing, but radially spaced apart from, inner cylindrical surface 23. In addition, flow divider 50 includes a central, axial through-bore 51 and tip R. In this embodiment, flow divider 50 is coaxially disposed within housing 20 such that axes 25, 35, 45, 55 are coincident.

Inner surface 53 is shaped similarly to outer surface 43 of flow stabilizer member 40. In this embodiment, outer surface 43 of flow stabilizer member 40 is frustoconical, and thus, inner surface 53 of flow divider 50 is also frustoconical. In particular, in this embodiment, flow divider 50 is an inverted cone; flow stabilizer member 40 at least partially extends into the upper end of flow divider 50.

The axial spacing and alignment of flow stabilizer member 40 and flow divider 50 are controlled and maintained by at least one circumferentially spaced alignment spacer 70. In embodiments, the axial spacing and alignment of flow stabilizer member 40 and flow divider 50 are controlled and maintained by a plurality of circumferentially spaced alignment spacers 70. In embodiments, three uniformly circumferentially spaced alignment spacers 70 are employed. The presence of alignment spacers 70 does not significantly affect the performance of IVI 10, as will be discussed further in Example 3J below.

The space formed between surfaces 43, 53 defines a major flow passage 61 in fluid communication with accelerating flow passage 60 and major flow outlet 20B via bore 51. In addition, the annular space formed between surfaces 54, 23 defines a minor flow passage 62 in fluid communication with accelerating flow passage 60 and minor flow outlet 20C.

Major flow passage 61 is preferably configured and oriented to extend both axially downward and radially inward. In this embodiment, major flow passage 61 is oriented at an angle α relative to axis 25 of about 45°. In this manner, IVI 10 offers the potential for a relatively smooth flow transition from substantially axial flow in flow passage 60 to major flow passage 61. Further, it should be appreciated that the generally mating geometries between surfaces 43, 53 offer the potential to minimize the presence of recirculation zones in major flow passage 61, thereby offering the potential to enhance flow stability.

As will be explained in more detail below, flow divider 50 serves to divide the accelerated bulk inlet airflow 90 into major flow 100 which travels radially inward through major flow passage 61 to major outlet 20B, and minor flow 110 which continues on a generally axial flow path through minor flow passage 62 to minor outlet 20C. In this embodiment, IVI 10 also includes a transition member 80 having walls 81 forming a diverging flow passage in fluid communication with major flow passage 61 via bore 51. Due to the diverging geometry of transition member 80, major flow 100 from major flow outlet 20B decelerates as it passes through transition member 80.

Transition 80 is optional component. In some applications, e.g., powder processing, transition 80 may not be needed. In other embodiments, transition 80 is in the form of a flow reducer rather than an expander.

Referring still to FIG. 1A, during operation of IVI 10, bulk inlet airflow or aerosol 90 flows into housing inlet 20A and is accelerated through acceleration flow passage 60. At critical zone 120 formed at the intersection of flow passages 60, 61 and 62, the accelerated bulk inlet airflow 90 is separated into major flow 100 comprising the generally smaller, finer particulate matter and minor flow 110 comprising the generally larger, coarser particulate matter. In some embodiments, major flow 100 comprises ninety percent of the total inlet flow 90 and minor flow 110 comprises the remaining 10%.

Without being limited by this or any particular theory, due to the greater inertia of the larger particles in bulk inlet airflow 90, they have a greater tendency to continue on their downstream axial trajectory into minor flow passage 62, whereas the lower inertia smaller particles in bulk inlet airflow 90 are more easily influenced and manipulated to flow into major flow passage 61. As will be explained in more detail below, the degree of separation and the size of the separated particles depend on a variety of factors including, without limitation, the geometry of critical zone 120.

Following division at critical zone 120, major flow 100 passes radially inward and axially downward into major flow channel 61, through bore 51, and is exhausted through major flow outlet 20B, whereas minor flow 110 passes substantially axially through minor flow passage 62 and is exhausted through minor flow outlet 20C.

The pressure differential necessary to generate flows 90, 100, 110 may be created by downstream suction devices, upstream pumps or blowers, or combinations thereof. To enhance uniform, stable flow, and the sufficient manipulation of relatively smaller particles to enable fractionation, downstream suction is the preferred method of initiating and maintaining flows 90, 100, 110.

Referring to the enlarged view of critical zone 120 shown in FIG. 1B, critical zone 120 represents the region or zone where the bulk inlet airflow 90 is accelerated and separated into major flow 100 and minor flow 110. As noted above, the geometry of critical zone 120 affects the operation of IVI 10. The geometry of critical zone 120 is defined by the geometrical shape, relative sizes, and spatial orientation of housing 20, flow accelerator 30, flow stabilizer member 40, and divider 50. Proper configuration of critical zone 120 may be achieved by (1) proper dimensioning of housing 20, flow accelerator 30, flow stabilizer member 40, and divider 50, and (2) accurate positioning of flow accelerator member 30 and flow stabilizer member 40 relative to flow divider 50 with alignment spacers 70.

Accelerating passage 60 formed between surfaces 33, 23 forms an annular nozzle having a minimum radial width (or slit or slot width) W that extends an axial distance, or slot length, $L_{60min}$ in critical zone 120. The inlet to major flow passage 61 at critical zone 120 is formed between surfaces 43, 53, and has an axial inlet height S. In this embodiment, the axial distance between surfaces 43, 53 generally increases moving radially inward toward bore 51. The inlet to minor flow passage 62 at critical zone 120 is formed between surfaces 54, 23, and has a radial width D.

At critical zone 120, the bulk inlet airflow 90 achieves a maximum velocity and is flowing substantially axially. Those particles within bulk inlet airflow 90 having a sufficient inertia (e.g., relatively larger, coarser particles) continue along their substantially axial path into minor flow passage 62. More specifically, the larger, coarser particles in bulk inlet airflow 90 with sufficient inertia cannot change direction fast enough to negotiate the turn into major flow passage 61, but rather, pass beyond major flow passage 61. These relatively large particles flow through minor flow passage 62 to minor flow outlet 20C as part of minor flow 110. However, the relatively low inertia particles (e.g., fine particles) in bulk inlet airflow 90 are capable of negotiating the turn into major flow channel 61. These relatively small particles flow through major flow passage 61 to major flow outlet 20B as part of major flow 100.

In this manner, aerosol 90 flowing into housing inlet 20A is accelerated to critical zone 120, where the relatively large particles are concentrated in minor flow 110 and the relatively smaller particles are concentrated in the major flow 100, thereby fractionating aerosol 90. In some embodiments, the relatively large particles in minor flow 110 are not of consequence, for example, when IVI 10 is operated as a pre-separator.

In some embodiments, heating of one or more components of IVI 10 (e.g., flow accelerator member 30, flow stabilizer member 40, flow divider 50, housing 20, etc.) may be used in applications where condensation may be a problem.

In some embodiments, housing 20 may be adapted to vibrate. This may be especially useful in powder processing, whereby the vibrations may effect loosening of particles from the walls and thus enable extended operation of the system between any needed cleaning operations.

Bell-Shaped Inlet (BSI)

Figure 2:
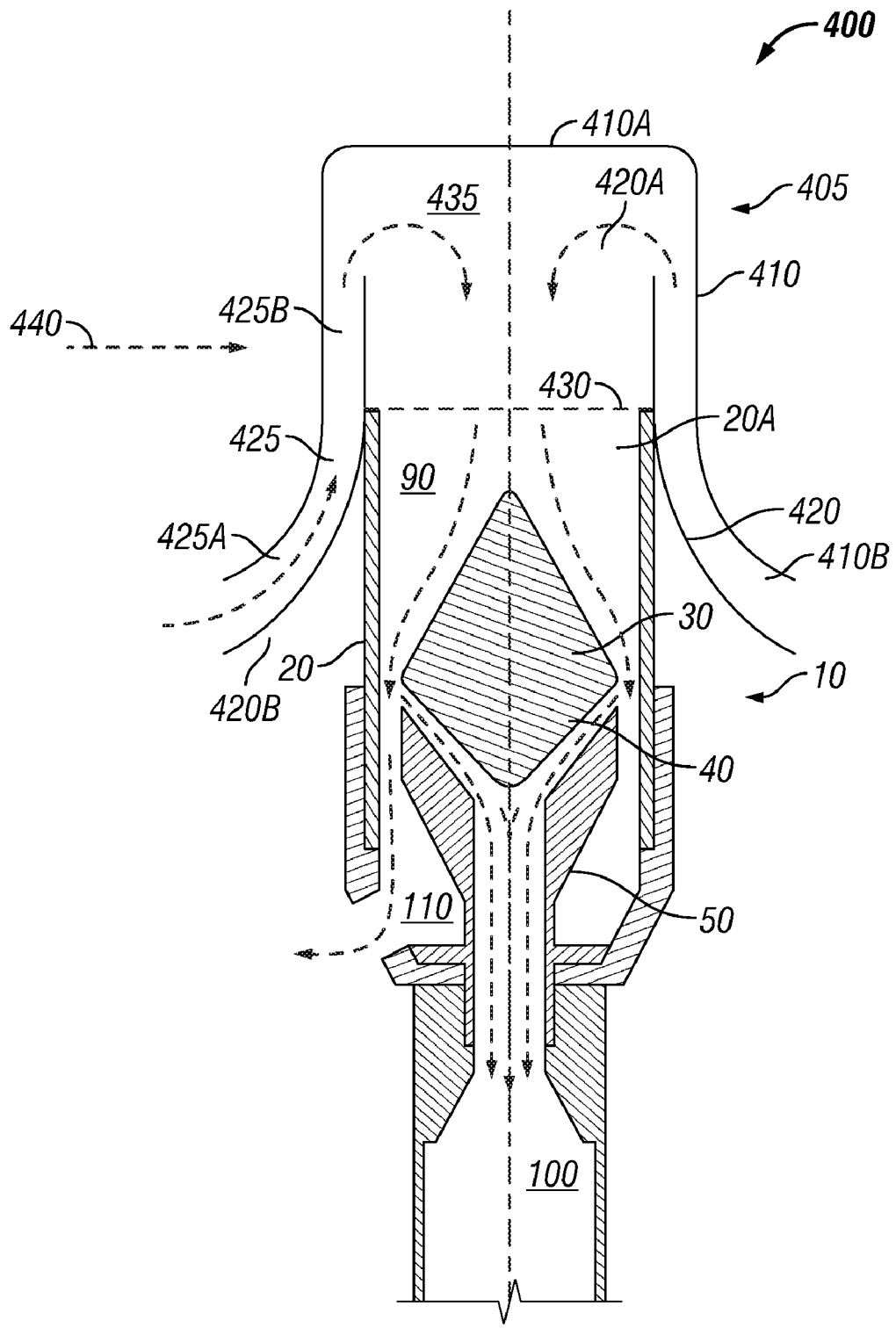
FIG. 2 is a cross-sectional view of an embodiment of an aerosol sampling inlet system including the inline virtual impactor (IVI) of FIG. 1A.
Figure 3:
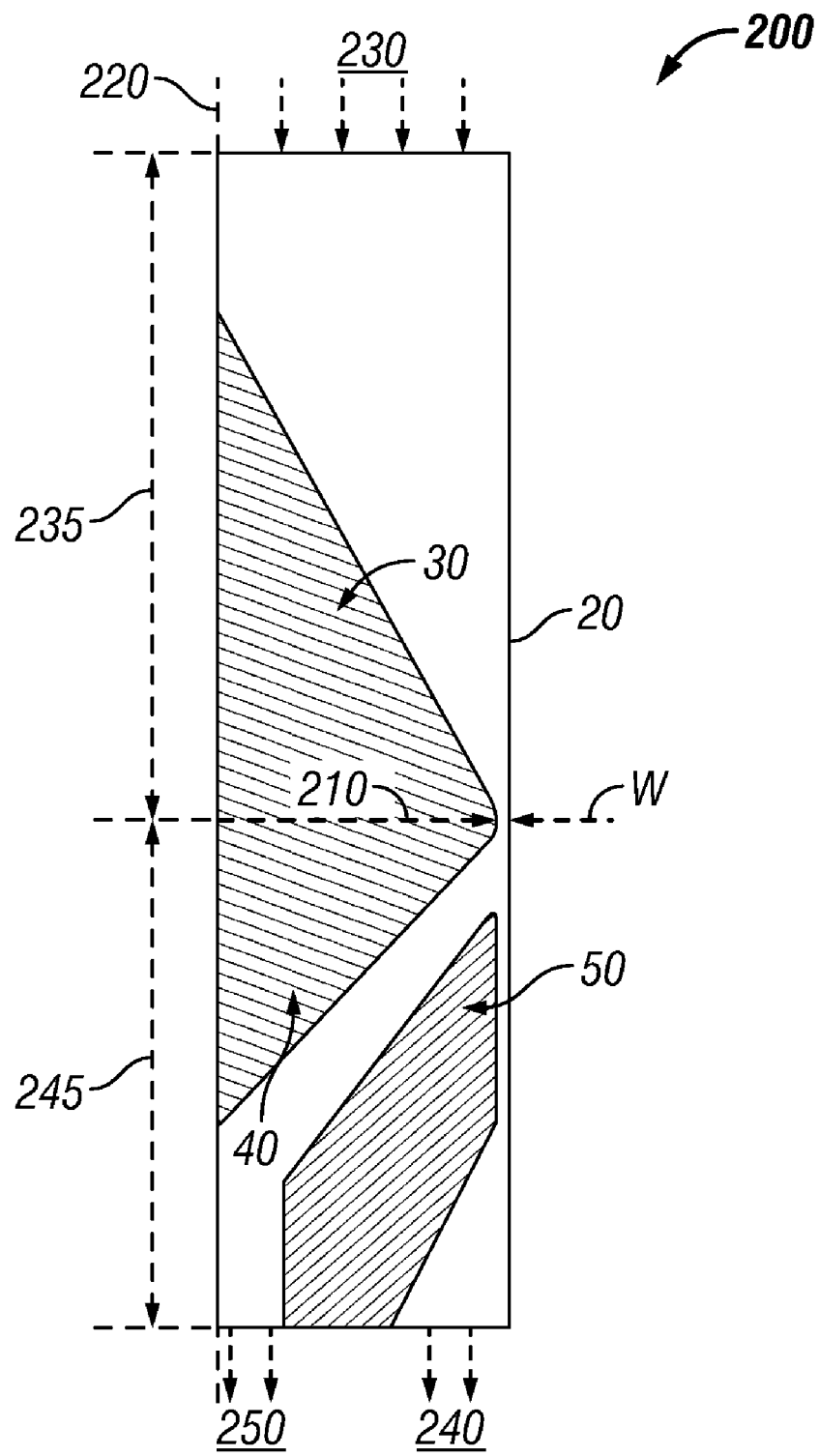
FIG. 3 is a schematic of the domain used in two dimensional numerical simulations of the IVI performance.
Figure 4A:
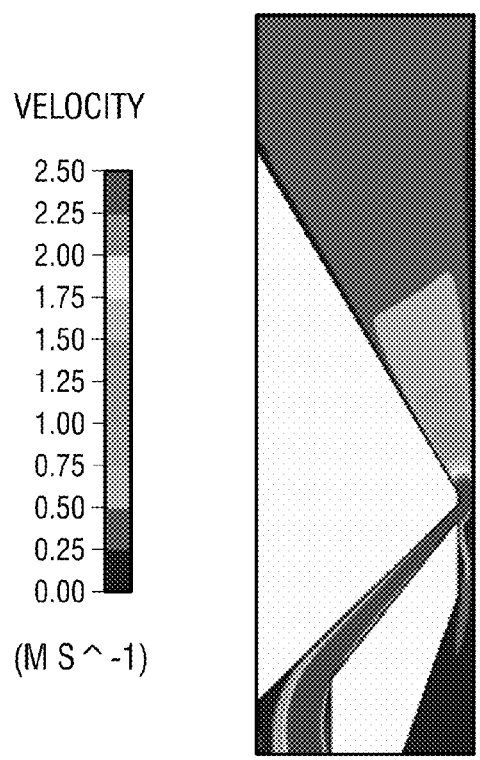
FIG. 4A is a representation of velocity contours in the flow field of an IVI. Flow enters the computational domain at the top of the figure.
Figure 4B:
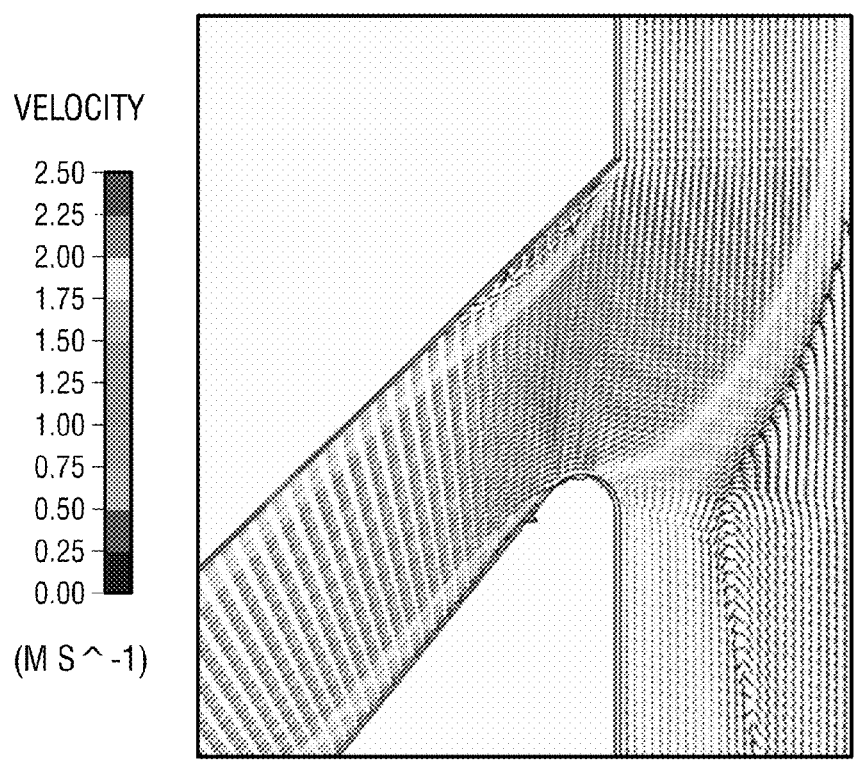
FIG. 4B is a representation of air velocity vectors in the critical zone where the flow separates into the major and minor flow streams. Downstream of the critical zone, the major flow is on the left and the minor flow is on the right.
Figures 5A, 5B, 5C:
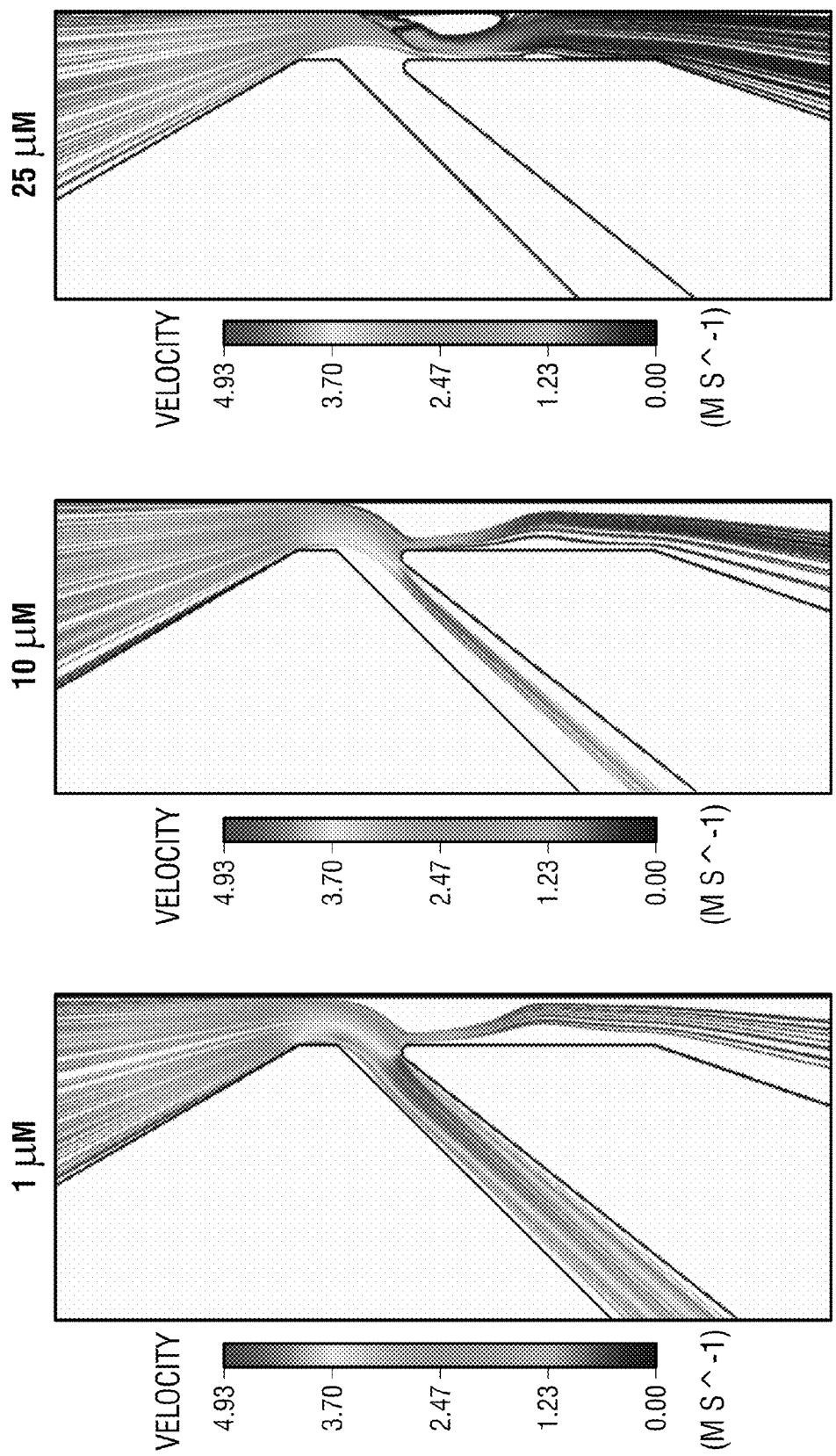
FIG. 5A shows aerosol particle trajectories with shading to indicate local velocities for 1 µm AD particles.
FIG. 5B shows trajectories of 10 µm AD aerosol particles.
FIG. 5C shows trajectories of 25 µm AD aerosol particles.

In embodiments, IVI 10 may further comprise the pre-separator of an inlet sampling system. Referring now to FIG. 2, an embodiment of an aerosol inlet system 400 is shown. System 400 comprises an IVI 10 as previously described and an inlet aspiration section 405 coupled to housing inlet 20A. In this embodiment, inlet aspiration section 405 is generally bell-shaped, and thus, may also be referred to herein as a bell-shaped inlet (BSI) aspiration section 405.

BSI aspiration section 405 comprises an outer housing 410 and an inner housing 420 at least partially disposed within outer housing 410. More specifically, outer housing 410 has a closed upper or first end 410A and an open lower or second end 410B, and inner housing 420 includes an upper end with openings, or an open end, 420A and a lower open end 420B. Inner housing 420 is coaxially aligned with outer housing 410, and further, inner housing 420 extends through open lower end 410B. In this embodiment, each housing 410, 420 is generally bell-shaped.

Outer housing 410 is axially spaced apart from inner housing 420, thereby defining an inlet flow channel 425 disposed radially between housings 410, 420, and an inner cavity 435 disposed axially below the upper end 410A. Inlet flow channel 425 has a lower curved section 425A and an upper axial section 425B, and is in fluid communication with cavity 435, open upper end 420A, and housing inlet 20A. In this embodiment, BSI 405 further comprises a screen 430 in-line with housing inlet 20A that serves to filter out undesirably large particles and to reduce non-uniformities in the flow entering housing inlet 20A.

During use of system 400, a portion of bulk airflow 440 (e.g., wind-driven ambient aerosol) flowing transversely across BSI aspiration section 405 enters inlet flow channel 425 at lower curved section 425A. Part of the bulk airflow 440 and entrained particles travels axially upwards through upper axial section 425B of flow channel 425 and into cavity 435. The bulk airflow 440 passing into cavity 435 passes through screen 430 into housing inlet 20A in the form of bulk inlet airflow or aerosol 90 previously described. Thus, it should be appreciated that relatively very large particles (e.g., plant debris) in bulk airflow 440 may be separated out via screen 430 prior to entry into IVI 10.

Experimental results obtained from an integrated BSI/IVI (e.g., aerosol inlet system 400) are presented in Examples 4A and 4B hereinbelow. The BSI employed in the testing was originally designed for a nominal air sampling flow rate of about 100 L/min and will be referred to as the BSI-100. However the device can accommodate air sampling flow rates as high as 400 L/min.

IVI Performance/Operating Conditions

Embodiments of IVIs described herein were designed, fabricated, modeled and experimentally tested as described in the Example section hereinbelow. Example 1 describes IVI design parameters. Example 2 describes Numerical Modeling, Example 3 describes experimental results for an IVI having a major flow rate of 100 L/min, and Example 4 describes integration of IVIs of the present disclosure with BSIs.

Flow Rate

The IVI may be designed to operate at various flow rates depending on the unit size and the desired cutpoint. In embodiments, the IVI operates at major flow rates from about 100 L/min to about 1250 L/min. In embodiments, the IVI operates at a major flow rate of about 100 L/min. In embodiments, the IVI operates at a major flow rate of about 400 L/min. In embodiments, the IVI operates at a major flow rate of about 800 L/min. In embodiments, the IVI operates at a major flow rate of about 1250 L/min. In embodiments, the inlet flow rate (flow rate of inlet airflow 90 into housing inlet 20A) is about 111 L/min. In embodiments, the inlet flow rate is about 444 L/min. In embodiments, the inlet flow rate is about 888 L/min. In embodiments, the inlet flow rate is about 1388 L/min. In embodiments, the IVI is operated at a major-to-minor flow rate ratio from about 4:1 to about 19:1. In embodiments, the IVI is operated at a major-to-minor flow rate ratio of about 9:1. Example 3K hereinbelow describes experimental results of the effect of minor flow ratio on major flow transmission efficiency. As shown in Example 3K hereinbelow, the $Stk_{50}$ may decrease as the minor flow rate fraction increases. However, the behavior of larger particles (sizes beyond the cutpoint) may show relatively small variations with flow rate ratio as compared with the effect noted for smaller particles (sizes smaller than the cutpoint).

Cutpoint

For a given particle size, the major flow transmission efficiency, $T_{maj}$, may be defined as $$T_{maj} = \frac{\text{Aerosol particle transport rate from major flow exhaust port}}{\text{Aerosol particle transport rate into IVI inlet}}. \quad (1)$$

The definition of transmission efficiency given by Equation (1) provides a fractional efficiency curve that is asymptotic, for small sizes or small Stokes numbers, to 1−f, where f is the ratio of minor air flow rate to inlet air flow rate.

The Stokes number, Stk, may be defined as, $$Stk = \frac{C_c \rho_p D_p^2 U}{9 \mu W} \quad (2)$$

wherein $C_c$=slip correction factor; $\rho_p$=particle density; $D_p$=particle diameter; U=carrier fluid (air) velocity at the throat of the acceleration nozzle; µ=dynamic viscosity of the carrier fluid; and, W=slot width. The cutpoint Stokes number ($Stk_{50}$) and cutpoint particle size ($D_{50}$) are based on conditions where 50% of particles injected into the IVI are conveyed out with the major flow. Major flow transmission efficiency curves for an IVI-100 according to Example 1 are presented in Example 3B hereinbelow. The experimental test setup for Example 3B is presented in Example 3A.

In embodiments, the cutpoint Stokes number is about 0.73 for an S/W ratio of 1.75. In embodiments, the cutpoint particle size is about 11 µm AD±1 µm AD and the major flow rate is about 100 L/min. In embodiments, the cutpoint is about 11 µm AD±1 µm AD and the major flow is about 400 L/min. The cutpoint Stokes number may be altered by changing the geometry of the IVI, e.g. by changing the geometrical spacing between the acceleration nozzle exit plane and the flow divider by, for example, adjusting the height of the alignment spacer(s). In embodiments the cutpoint Stokes number is about 0.35 for an S/W ratio of 1.03. In embodiments, the cutpoint Stokes number is about 0.45 for an S/W ratio of 1.35. In embodiments, the cutpoint particle size can be changed by adjusting the inlet flow rate or throat width.

Steepness of the Major Flow Transmission Efficiency Curve

The steepness of the transmission efficiency curve can be represented by the geometric standard deviation, $s_g$, of the transmission efficiency values, which for discretized data is [McFarland et al., 1984]:

$$\ln^2 s_g = \frac{1}{n}\sum_{i=1}^{n} \Delta T_{maj,i}(\ln Stk_i - \ln Stk_{50})^2 \quad (3)$$

where: n=number of particle size intervals; $Stk_i$ is the value of the Stokes number at the midpoint of the $i^{th}$ interval; and, $\Delta T_{maj,i}$ is the width of the $i^{th}$ interval in terms of transmission efficiency values.

Real impactors have steepness parameters that are in the approximate range of 1.1 [Marple et al., 1984] to 1.3 [Thompson et al., 1994]; whereas virtual impactors have steepness parameters in the approximate range of 1.3 [Ding et al., 2001] to 2.1 [Haglund and McFarland, 2004]. In embodiments, the steepness of the major flow transmission efficiency curve is about 1.5. In embodiments, the IVI of the present disclosure provides a steepness of the major flow transmission efficiency curve that is comparable, or less than, the values for other traditional virtual impactors and to that of some real impactors. Example 3D describes experimental results for the steepness of the transmission efficiency curve for an IVI according to an embodiment of this disclosure.

Changes in Cutpoint

An interesting feature of the IVI is the ability to vary cutpoint particle size by varying the S/W ratio through adjustment of the height of alignment spacers 70. This adjustment causes the $Stk_{50}$ to change and thereby causes a change in cutpoint for fixed values of the flow rate and fixed values of other geometric parameters. Example 3C contains a description of the effect of varying the aspect ratio of an IVI according to this disclosure. The construction of the IVI of the present disclosure also allows the device to be used for various flow rates by using different cone sizes for the flow accelerator member 30 and flow stabilizer member 40 of the dual cone to modify the slot width W, thus enabling maintenance of a constant $Stk_{50}$ value.

Effect of Reynolds Number on Cutpoint Stokes Number

The acceleration nozzle Reynolds number has a slight effect on the cutpoint Stokes number. In embodiments, the IVI of the present disclosure provides a Reynolds number of 545 which yields a $Stk_{50}$ value of 0.73 while a Reynolds number of 1730 results in a cutpoint Stokes number of 0.80. Example 3E hereinbelow further describes the effect of Reynolds number on cutpoint Stokes number.

Wall Losses

In embodiments, the wall losses of an IVI of the present disclosure are less than about 30% as experimentally measured near the cutpoint size. Example 3F hereinbelow describes experimental methods used to determine internal wall losses. In embodiments, those wall losses are essentially associated with the coarse fraction (minor flow), and do not have a significant impact on the desired aerosol fraction (the fine fraction). In embodiments, there is no significant buildup of deposits even with severe exposure. As shown in Example 3G hereinbelow, a test in which an IVI of the present disclosure underwent severe exposure to dry dust (145 mg of particulate matter with a mass median particle size of about 10 µm AD) yielded no significant buildup of deposits.

Pressure Drop

In embodiments, the IVI of the present disclosure operates at a low pressure drop. In embodiments, the pressure drop across the IVI inlet for an inlet flow rate of 111 L/min and a major exhaust flow rate of 100 L/min and an aspect ratio, S/W, of 1.75 is about 45 Pa. Example 3I hereinbelow describes experimental pressure drop results for an IVI-100 of this disclosure.

Applications

In embodiments, IVI 10 is used for scalping large-sized aerosol particles from the sampled size distribution prior to collection or analysis. In embodiments, the disclosed IVI is used as a pre-separator to strip large particles from the size distributions delivered by bioaerosol sampling inlets. In embodiments, IVI 10 is used as a pre-separator for bioaerosol concentrators and collectors that operate at flow rates of approximately 100 L/min. However, IVI 10 may be scaled to accommodate other flow rates and cutpoints.

Because it is a virtual impactor, the IVI of the present disclosure minimizes solid particle carryover. In embodiments, the IVI of the present disclosure substantially eliminates large particle carryover. The IVI may have a compact size and accommodate a range of flow rates with minor modifications. The IVI minimizes or eliminates the need for oiled/ greased collection surfaces of real impactors. Due to special design features, the need for cleaning is minimal. The IVI may be used, as further discussed hereinbelow, for size separation of pharmaceutical or other powders. In some embodiments, the IVI may be used to separate powders into a coarse fraction and a fine fraction. In some embodiments, the fine fraction is devoid of coarse particles, i.e. the fine fraction is a zero defect fine fraction.

As described by Haglund and McFarland [Haglund, J. S. and McFarland, A. R. (2004). A Circumferential Slot Virtual Impactor. *Aerosol Sci. Technol.* 38:664-674], a circumferential-slot virtual impactor has certain inherent advantages relative to a circular jet virtual impactor in that a narrow slot can be easily fabricated and, provided the flow is stable, aerosol fractionation can be achieved with a low expenditure of pressure. In embodiments, the simplicity of the IVI of the present disclosure and the low pressure drop during operation allow for low cost fabrication and operation.

Computational fluid dynamics techniques described in Examples 2A-2C hereinbelow, were used as an optimization tool to determine appropriate combinations of performance determinant geometrical parameters for an IVI of the present disclosure. The IVI exhibits relatively sharp separation characteristics, which are similar to, or better than other virtual impactors and approach those of some real impactors, while it also minimizes and/or eliminates particle bounce and re-entrainment. The dual cone approach provides stable flow through the critical zone 120.

In general, for an application involving similar inlet flow rates and cutpoint ($D_{0.5}$) sizes, a slot virtual impactor has a lower pressure drop than a device that uses circular nozzles. The axial alignment of the acceleration nozzle and the nozzle that receives the large particles (minor flow) is critical and that alignment may be much more easily achieved with the present invention than previously described virtual impactors. For the present invention, the alignment is achieved by placement of double cone comprising flow accelerator member 30 and flow stabilizer member 40 relative to the inner wall of tube 20. By way of contrast, conventional virtual slot impactors typically comprise two large blocks of metal that contain multiple acceleration and receiver nozzles, each pair of which must be accurately positioned by the machining of the blocks and relative placement thereof in order to achieve desired performance. For those devices, flow stability may be a problem, which can considerably degrade the transmission efficiency of the system.

The IVI may provide superior performance to existing approaches for applications including, but not limited to, air sampling and powder fractionation. With respect to air sampling the IVI may be used to strip particles with sizes greater than a prescribed cutpoint from the distribution of sizes in the air stream that enters an inlet system. For example, the U.S. Environmental Protection Agency has a requirement for ambient air sampling of particulate matter, where the aerosol is first passed through a fractionator with a cutpoint of 10±1 µm AD prior to collection of the aerosol for retrospective analysis.

In a typical application involving air sampling, where the IVI is used to scalp large, unwanted particulate matter from the aerosol size distribution, the major flow may be comprised of particles smaller than about 10 µm aerodynamic diameter (AD) and the minor flow may contain aerosol particles with sizes greater than about 10 µm AD. When the device is used in powder processing, the cutpoint will be application specific, e.g., if it were desired to fractionate a pharmaceutical powder, which would be used in inhalation therapy, the cutpoint size may be 4 µm AD. For powder processing applications, the coarse particle fraction, which is entrained in the minor flow, could be re-cycled (e.g., passed through a grinding system) and then fed once more into the IVI. In this embodiment, the fine fraction may be the useful product of the fractionation process.

The majority of currently used fractionators in air sampling applications are classical impactors, where the coarse fraction is collected on a solid surface; and the most common fractionators in powder processing are cyclones, where curvilinear flow is used to cause larger particles to impact against walls. With the real impactors, heavy dust loading will cause carryover of coarse particles; and even with oil- or grease-coated surfaces, fibrous particles in the collected deposits will cause inadvertent collection of particles from the fine fraction. Similar problems have been encountered when cyclones have been used as pre-separators in air sampling. Both of these approaches require frequent maintenance to clean the collection surfaces. With respect to the pre-separation process in bioaerosol sampling, the real impactors currently dominate the application. Real impactors without grease- or oil-coated collection surfaces exhibit solid particle carryover, and real impactors with coated collection surfaces need frequent cleaning to reduce the collection of fine-fraction particles by previously deposited fibrous materials that protrude into the sample air stream above the collection surface. Because of the necessity for careful alignment of the acceleration and receiver nozzles, and the ensuing high cost, application of the device of conventional virtual impactors is generally limited to high cost bioaerosol detection systems.

A second area of IVI application is powder processing, wherein powder having a size distribution is divided into a coarse and a fine fraction. As an example, wires of superconductor materials can be fabricated by a process that involves fusing of powder. However, the quality of the product is, however, adversely affected by the presence of particles with sizes greater than a prescribed value.

In embodiments, coarse particles are separated from finer particles using at least one IVI. In some embodiments, particle separation is performed via two or more IVIs. In some embodiments, particle separation is performed via three or more IVIs. In certain embodiments, particle separation is performed via four or more IVIs. In embodiments having multiple IVIs, the IVIs may be arranged in series, in parallel, or a combination thereof. For example, in embodiments, the separation is performed in stages. The stages may be carried out in series, and each stage may comprise one or more IVIs operating in parallel.

In embodiments, the disclosed method is used to separate larger particles from biological aerosol particles in a size range of interest. In such embodiments, the cutpoint may be about 11 µm AD. In embodiments, the disclosed method is for separation of larger particles from PM-10 aerosols, for example ambient sampling according to EPA [U.S. EPA, 1987]. In such embodiments, the cutpoint may be about 10 µm AD±1 µm AD. In embodiments, the method is used to prepare pharmaceutical powders for sampling in the major flow, and the cutpoint is in the range of from about 2 µm AD to about 6 µm AD. In still other embodiments, the method of the present disclosure is utilized to prepare superconductive materials having a cutpoint in the range of from about 1 µm AD to about 5 µm AD.

EXAMPLES

Example 1

100 L/min IVI Design

Figure 6:
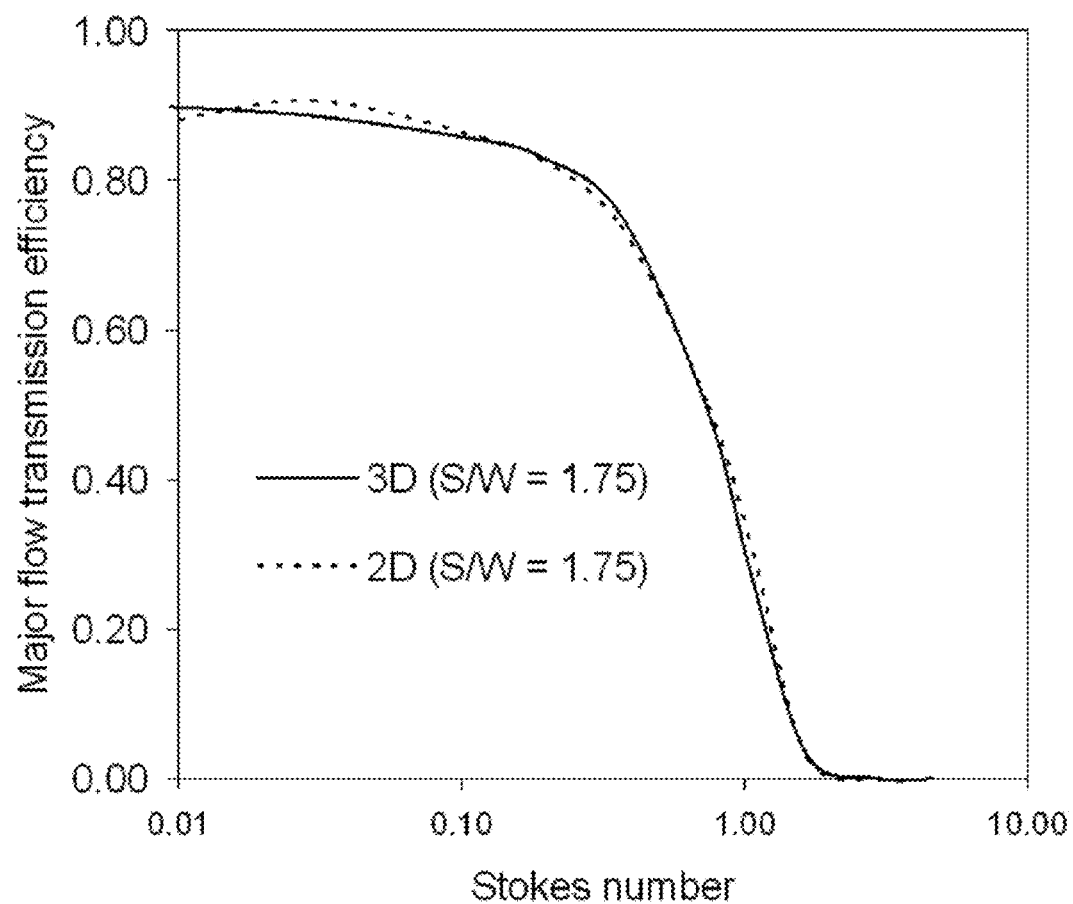
FIG. 6 is a plot of major flow transmission efficiency as a function of Stokes number showing the comparison of two-dimensional (2-D) and three dimensional (3-D) simulation results.

A dual-cone in-line circumferential-slot virtual impactor (IVI) was designed and tested using both numerical and experimental techniques. The IVI was tested as a pre-separator for sampling inlets, where the device scalps large particles from the aerosol size distribution. Numerical simulation was the principal tool employed in the design process, with physical experiments used to verify computational predictions. Performance investigations were primarily carried out for a configuration that provides a nominal cutpoint particle size of 10 μm aerodynamic diameter at an inlet flow of 111 L/min and a major flow exhaust of 100 L/min; however, as mentioned hereinabove the apparatus is scalable in terms of both flow rates and cutpoint sizes. In this embodiment, shown in FIGS. 1 and 2, the inverted dual cone encased inside a tube provided a characteristic circumferential slot of width W of 2.54 mm (0.100-inches) and a slot length $L_{60_{min}}$ of 239 mm (9.42-inches) at critical zone 120. Upper cone 30 caused inlet flow 90 to accelerate to an average throat velocity of 3.15 m/s, while lower cone 40 directed the major flow 100 toward major flow outlet 20B and minimized recirculation zones that could cause flow instabilities in major flow channel 61.

An IVI according to the present disclosure was made having a 100 L/min major flow rate 100. This IVI will be referred to in these Examples as IVI-100. The design parameters for the prototype are shown in Table 1 below. For this embodiment, an inlet flow rate 90 of 111 L/min was air drawn into IVI-100 where it was accelerated in the nozzle formed by the gap between the waistline of the dual cone and the wall of tube 20.

TABLE 1

Design Parameters for IVI-100 with 10 μm AD Cutpoint and 100 L/min. Major Flow Rate

| Parameter | Value |
|---|---|
| Throat Width (W) | 2.54 mm |
| S/W Ratio | 1.75 |
| Throat Reynolds Number | 545 |
| Inlet Aerosol Size Range | ≦50 μm AD |

Computational Fluid Mechanics (CFD) software was used to model the flow as a means of optimizing the design. Aerosol tests were conducted with impaction variants. Tests were also conducted to examine the feasibility of using the system as a production tool for processing bulk powders, where the processing must be done in a manner such that the fine fraction does not contain coarse particles with sizes greater than a prescribed size.

Example 2

Numerical Modeling

CFX™ computational fluid dynamics software (Version 10.0, ANSYS, Canonsburg, Pa.) was used for designing and for modeling the performance of the IVI-100 of Example 1. CFX uses a coupled algebraic multi-grid solver that solves the hydrodynamic system of equations across all grid nodes. Initial geometric design and optimization studies were performed using 2D simulations; however, once the appropriate combination of parameters was determined, a 3D simulation was performed on the final design to ensure that the 2D predictions were representative of the fluid flow and particle physics in the IVI.

Example 2A

Geometry and Meshing

FIG. 3 is a schematic of the domain 200 used in two dimensional numerical simulations along with the boundary conditions. In FIG. 3, the inlet mass flow rate inlet boundary is 230, the major flow mass flow outlet boundary is 250, the minor flow mass flow outlet boundary is 240, the base plane of the dual cone comprising flow accelerator member 30 and flow stabilizer member 40 is 210, the distance from inlet mass flow rate inlet boundary 230 to base plane 210 is 235, and the distance from base plane 210 to major flow mass flow outlet boundary 250 is 245. The axis of symmetry 220 is the left boundary. As the flow in the IVI can be considered to be axi-symmetric, a computational model representative of the IVI geometry was created by revolving the 2D profile by an angle of 3° to 5° about the central axis of rotation 220, as suggested by CFX [ANSYS, 2005]. A block structured body fitted mesh was generated over the entire domain using ICEMCFD™ (Version 10.0, ANSYS, Canonsburg, Pa.).

Example 2B

Flow Field and Particle Tracking

Fluid and particle transport in the IVI was modeled with a Eulerian-Lagrangian framework. The bulk fluid (continuous phase) flow field was solved using the Eulerian approach and then the particle trajectories were calculated using Lagrangian tracking, with the assumption that the particles neither influence the flow field nor each other.

Two-dimensional simulation results showing air velocity contours in the IVI are shown in FIG. 4A and two-dimensional simulation results showing velocity vectors in the critical zone are shown in FIG. 4B. Velocity vectors in the minor flow region near the critical zone show the presence of a small recirculation bubble. Because the accelerated flow impinges into a relatively static void the recirculation was not completely eliminated, although recirculation was minimized by geometry optimization.

Examples of particle trajectories computed for the 2D geometry are shown in FIGS. 5A-5C. FIG. 5A illustrates the behavior of 1 μm AD aerosol particles, which are well below the cutpoint size of the 10 μm AD and consequently follow the flow streamlines. Trajectories of cutpoint size particles (10 μm AD) are shown in FIG. 5B, where 50% of the particles that enter the IVI at the inlet boundary 230 are carried across the major flow outlet boundary 250. Particles of this size are prone to impacting on the flow divider tip. However, by observing the particle trajectories and performing suitable modifications to the critical zone geometry it is possible to reduce the wall losses for the desired cutpoint size. FIG. 5C shows the trajectories of 25 μm AD particles, which are well above the cutpoint size. They deviate from the flow streamlines in the critical zone and are inertially driven into the minor flow region.

Hari et al. [2005] determined that tracking of 500 particles of each size was sufficient to ensure the independence of the obtained results from the number of particles included in tracking. In this study, 1000 particles of each size were tracked to determine the fractionation characteristics of the IVI. Each particle was tracked from the injection point to its final destination (either a flow boundary or an internal wall). Particles that contacted an internal wall were considered to adhere to the wall. Major-flow transmission efficiency for each size was obtained as the ratio of the number of particles in the major flow exit to the number of particles that were originally injected at the inlet boundary.

Example 2C

Comparison Between 2D and 3D Numerical Simulations

Optimization studies on the IVI-100 design of Example 1 were performed on a 2D domain as shown in FIG. 3 and described hereinabove. However, three-dimensional simulations were conducted on an optimized version of the IVI for assurance that the 2D results were suitable. FIG. 6 shows the comparison between the major flow transmission efficiency curves obtained using 2D and full domain 3D simulation for S/W=1.75. The cutpoint Stokes number predicted by both simulations was 0.73. The minor deviations are likely due to the manner in which a 2D axi-symmetric simulation is performed in CFX. When revolving the 2D profile along the axis, the profile is displaced by a small 'δ' in order to avoid a singularity along the axis, while in 3D the entire domain is simulated and no such displacement is necessary.

Example 3

IVI-100 Experimental Results

Example 3A

Test Setup

The IVI-100 of Example 1 was experimentally tested to characterize the major-flow transmission efficiency for a range of monodisperse liquid aerosol particle sizes from 4.0 to 15.0 μm AD. Here, the major-flow transmission efficiency for a given particle size is defined as given in Equation (1) hereinabove.

Figure 7:
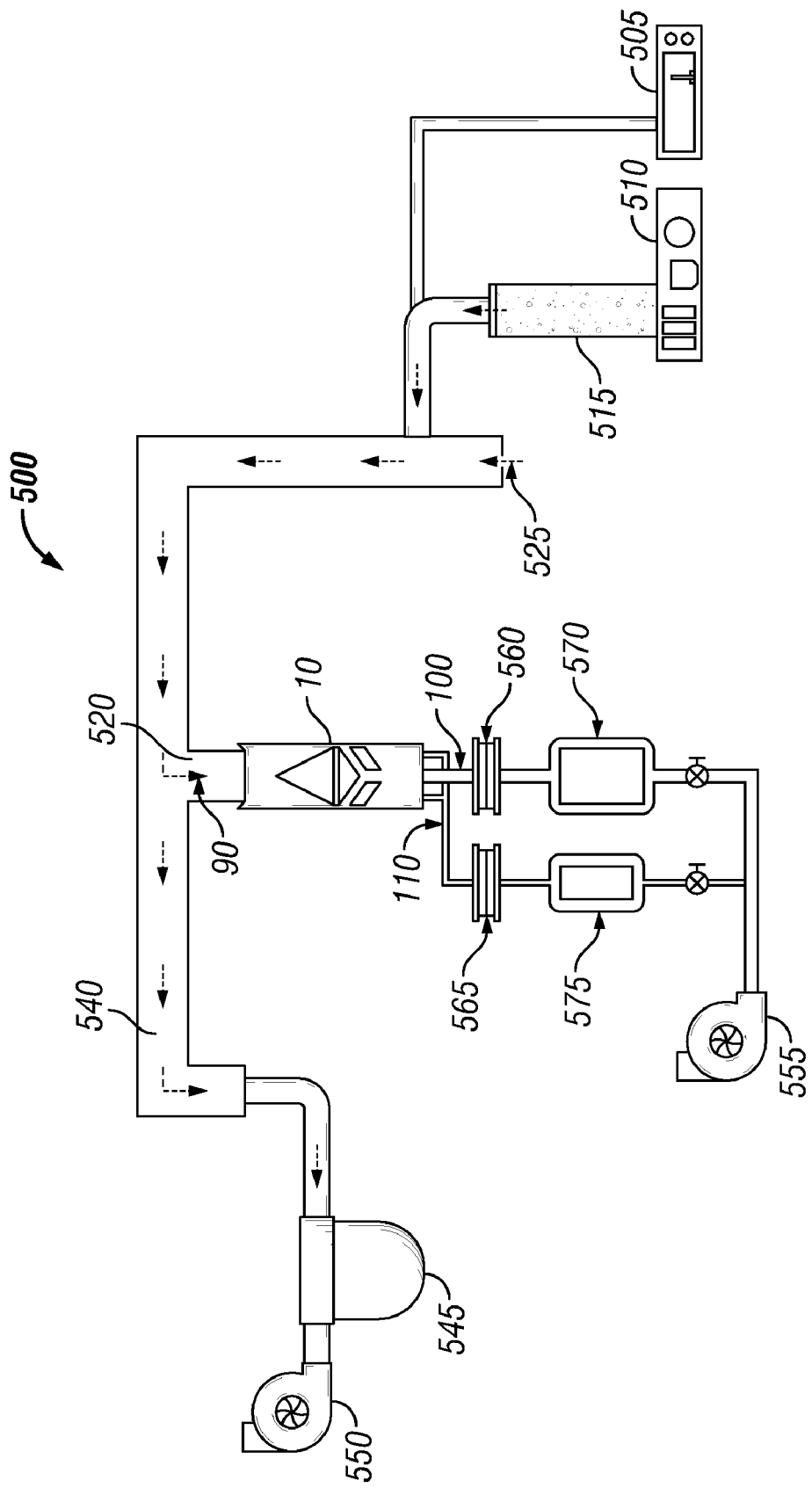
FIG. 7 is a schematic of experimental apparatus use to test an IVI, designed according to an embodiment of this disclosure, in a stand-alone mode.

FIG. 7 is a schematic of a test setup 500 that was used for testing a stand-alone IVI according to an embodiment of this disclosure. Aerosol, output from a vibrating orifice aerosol generator 510 (VOAG, TSI Inc, Shoreview, Minn.), was passed via electrical charge neutralizer 515 through flow duct 520 where IVI inlet stream 90 having a flow rate of 111 L/min was extracted and drawn through IVI 10. Aerosol sampling filters 560 and 565 were used to collect particles from the major flow 100 and the minor flow 110 respectively. The major flow rate was 100 L/min and the minor flow rate was 11 L/min. An excess aerosol filter 545 was used to eliminate the aerosol 540 not drawn into IVI 10. The filters used were 47 mm, Type A/D glass fiber filters obtained from Pall Corp., East Hills, N.Y. Blowers 550 and 555 were positioned on the excess aerosol flow line and on the IVI outlet flow lines respectively. Mass flow meters 570 and 575 were used to measure the flow rates of the major flow 100 and the minor flow 110 respectively. Make-up air was provided by make-up air stream 525.

Reference samples, used to provide information for the denominator in Equation (1) (inlet flow), were acquired by replacing IVI 10 in setup 500 of FIG. 7 with a filter sampler operated at the same (111 L/min) flow rate. For a given set of experimental conditions, the reference filter and IVI 10 were alternated to obtain at least triplicate samples.

The aerosol particles were liquid droplets formed from atomization of an alcohol solution of oleic acid tagged with a fluorescent tracer (sodium fluorescein). The consistency of the aerosol being generated by VOAG 510 was monitored with an aerodynamic particle sizer, (APS, TSI Inc, Shoreview, Minn.) 505. The true size of the aerosol particles was determined microscopically as larger liquid droplets are known to distort when accelerated in the APS measurement section. Droplet size was calculated from the microscopically-measured size adjusted for flattening of the droplets on a microscope slide according to the method described by Olan-Figueroa et al. [1982], but with a flattening factor of 1.29 [Thien, 2006] to take into account a different oil-phobic coating on the slides than that used by Olan-Figueroa.

Relative concentrations of aerosol in the test and reference samples were obtained by eluting the fluorescent dye from the test filters and analyzing the solutions fluorometrically (Turner Model FM109515, Quantech Barnstead International, Dubuque, Iowa). The filters were placed in a solution of 50% isopropyl alcohol and 50% distilled water (v/v) for at least four hours. For selected tests, wall losses were recovered by opening the IVI unit 10 and extracting the deposited particles using a cotton swab moistened with isopropyl alcohol.

Example 3B

Transmission Efficiency

The major flow transmission efficiency was determined as given in Equation (1) hereinabove. The major-flow transmission efficiency curves, $T_{maj}$, obtained for the IVI-100 of Example 1 operated at an inlet flow rate of 111 L/min and a major flow rate of 100 L/min, are shown in FIG. 8.

Here, $T_{maj}$ is plotted as a function of Stokes number, Stk, where the latter is defined as given in Equation (2) hereinabove. The ratio S/W, where S is the distance between the acceleration nozzle exit plane 215 and the tip R of flow divider 50, and W is the slot width of the annular nozzle, FIG. 1B, also influences the performance of the IVI.

Figure 8:
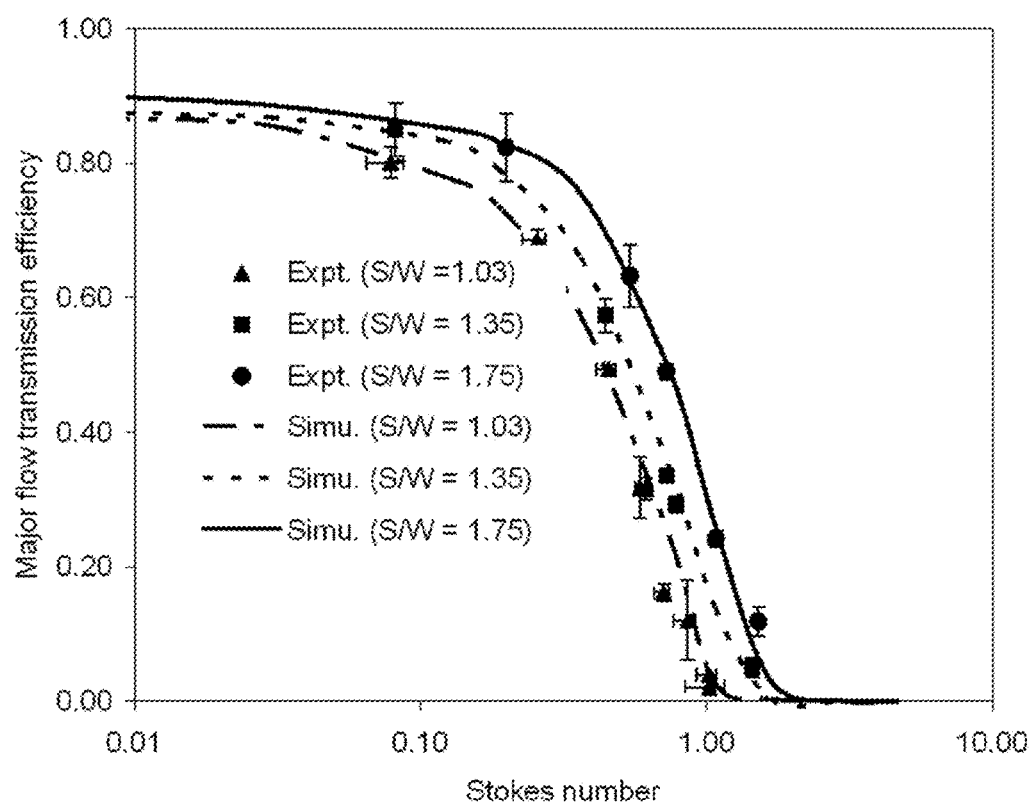
FIG. 8 is a plot of major-flow transmission efficiency as a function of Stokes number for an IVI of the present disclosure. The effect of aspect ratio on performance is shown for S/W values of 1.03, 1.35 and 1.75. In the legend, "Simu" represents numerical simulation results, and "Expt" represents experimental result. Error bars on the experimental results are ±1 standard deviation about the mean value.

As shown in FIG. 8, the numerically predicted $Stk_{50}$ value of the IVI-100 is 0.73 when the S/W ratio is 1.75, which is the typical design value for this embodiment. The results of the experimental tests verify this prediction for the value of $Stk_{0.5}$. In terms of particle size, when the major exhaust flow rate is 100 L/min (at an inlet flow rate of 111 L/min) in the prototype unit, the cutpoint size is 10 μm AD. The cutpoint Stokes number was 0.73 for these design and operating conditions; however, the cutpoint can be adjusted by changing the geometrical spacing aspect ratio (S/W) between acceleration nozzle exit plane 215 and flow divider 50, as mentioned hereinabove.

Example 3C

Aspect Ratio

Referring again to FIG. 8, which is a plot of major-flow transmission efficiency as a function of Stokes number for an IVI-100 of the present disclosure as described above, the effect of the aspect ratio, S/W, was investigated both numerically and experimentally for S/W values of 1.03, 1.35, and 1.75. Error bars on the experimental results are ±1 standard deviation about the mean value. FIG. 8 shows the cutpoint Stokes number increased with increasing values of the S/W ratio. The cutpoint Stokes numbers for the aspect ratios of 1.03 and 1.35 are 0.45 and 0.53, respectively. Thus, an IVI of the present disclosure may provide a degree of flexibility in adjusting the cutpoint for an application where the flow rate is specified, i.e, by altering the aspect ratio.

Example 3D

Steepness of the Transmission Efficiency Curve

The steepness of the transmission efficiency curve can be represented by the geometric standard deviation, $s_g$, of the transmission efficiency values, Equation (3). Major flow transmission efficiencies ranging from 5 to 80% were utilized in calculating the steepness, as the major flow transmission efficiency is asymptotic to 90%. For 7 equally spaced intervals, Equation (3) yields a value of 1.51 for $s_g$. By comparison, Haglund and McFarland [2004] presented minor flow transmission efficiency results for a circumferential slot virtual impactor, and the steepness of their curve, calculated from Equation (3), was 2.1. The reported steepness of the fractionation curve for a linear slot virtual impactor was 1.3 [Ding et al., 2001]. As a reference, the value of $s_g$ would be unity for an ideal fractionator with a step-type fractionation curve, with increasing values of the steepness value associated with poorer fractionation characteristics.

The fractionation curves of typical classical impactors have steepness values of 1.1 to 1.3 when calculated with Equation (3). This indicates the transmission efficiency curves of the IVI of the present disclosure are steeper than the circumferential slot virtual impactor but not as steep as the fractional efficiency curve for a real slot impactor. However, the value of 1.51 for the IVI is comparable to the value of 1.3 noted for some real impactors.

Example 3E

Effect of Reynolds Number on Cutpoint Stokes Number

Analyses were conducted with an IVI scaled up to be operated at a major flow rate of 350 L/min, which results in an acceleration nozzle Reynolds number, Re, of 1730 as compared with the value of 545 for the major flow rate of 100 L/min. The Reynolds number is defined as:

$$Re = \frac{\rho_f U W}{\mu} \quad (4)$$

where: $\rho_f$=density of the carrier fluid. The numerically predicted value of $Stk_{50}$ was 0.80 for the Reynolds number of 1730, which is slightly higher than the value of 0.73 associated with the Reynolds number of 545. This effect of Reynolds on the value of $Stk_{50}$ is due to differences in the flow field at the different Reynolds numbers.

Example 3F

Internal Wall Losses

Figure 9:
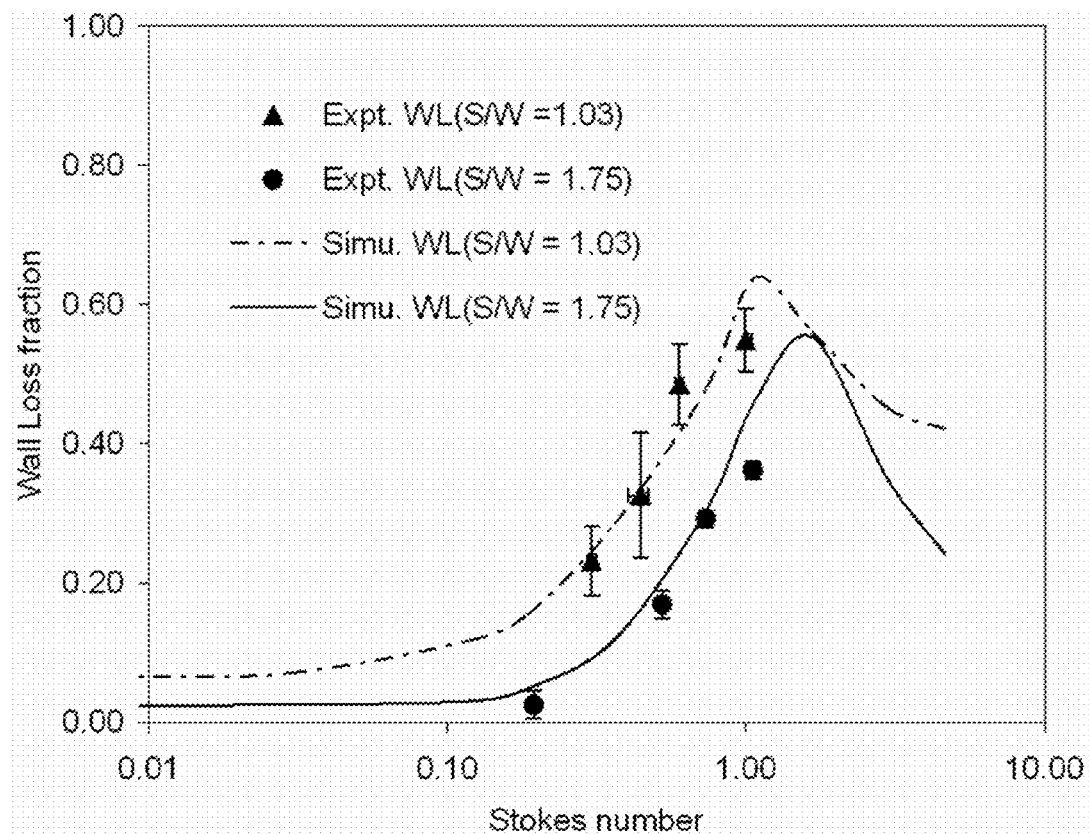
FIG. 9 is a plot of internal wall losses as a function of Stokes number for an IVI according to an embodiment of the present disclosure.

The transmission efficiency curves presented in FIG. 8 take into account the internal wall losses. FIG. 9 shows the experimental and predicted wall loss characteristics as a function of Stokes number for an IVI-100 according to an embodiment of the present disclosure. Losses at the cutpoint Stokes numbers (0.73) were experimentally measured to be about 30%, and are numerically predicted to be about the same value. It is important to note that these losses are primarily associated with the coarse particle fraction (minor flow). For example, the peak predicted losses occur at a particle size of 15 µm AD; inspection of the trajectories of those particles show the wall impacts occur almost exclusively on the minor flow side of the flow divider. About 7% of the losses for S/W=1.75 and 11% of the losses for S/W=1.03 occur in a recirculation zone in the minor flow region downstream the flow divider tip R (FIGS. 1A and 1B). The higher losses calculated for the smaller value of S/W, are due to greater impaction on the flow divider tip R for the latter case.

While the presence of wall losses tended to shift the cutpoint to lower Stokes number values, wall losses did not interfere with the operation of the IVI-100 as a pre-separator, where only the fine fraction is of interest.

Example 3G

Tests with Aerosolized Arizona Road Dust

Tests were conducted with aerosolized dry (ARD) Arizona Road Dust/Fine (ISO 12103-1, A2 Fine Test Dust, Powder Technology Inc., Burnsville, Minn.), which has a mass median diameter of about 10 µm. A total of 145 mg of dust was sampled by the IVI-100 over a period of 10 minutes and there was no buildup of dust in the critical zone 120. The test utilized a stand-alone IVI-100.

Figure 10:
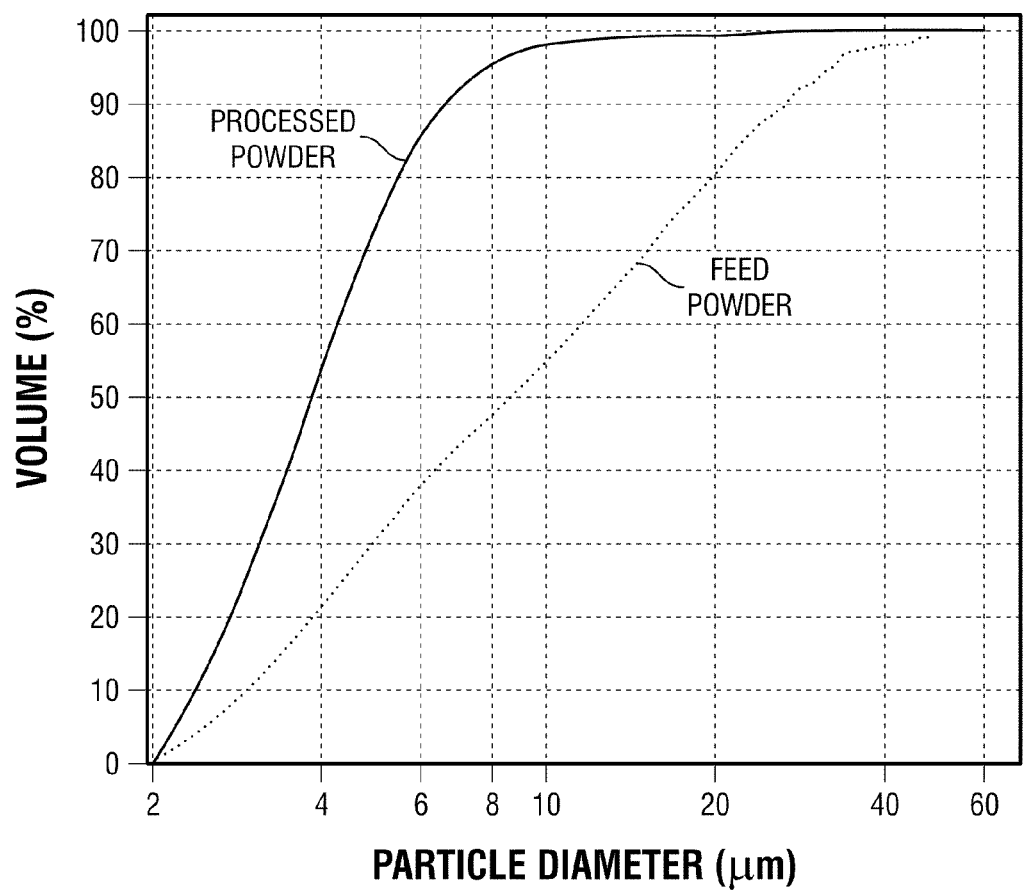
FIG. 10 gives cumulative distributions (volume percent as a function of particle diameter) of Arizona Road Dust/Fine before and after separation. The results are based on Coulter Counter analyses and particle size is not aerodynamic diameter, but rather the diameter of a sphere with the same volume as the particle of interest.

About 100 mg of Arizona Road Dust (Fine) was fed into an IVI in 3 minutes. The mass concentrations of aerosol at the inlet and at the major flow exhaust port were measured. Size distributions of inlet aerosol and fine fraction were determined with a Coulter Counter, which is an apparatus for counting and sizing solid particles. The Coulter Counter detects changes in electrical conductance of a small aperture through which an electrolytic fluid is drawn. Particles in the fluid, which have a different electrical resistance than the fluid, momentarily alter the conductance of the aperture providing electrical signals proportional to particle volume. FIG. 10, which is a plot of the cumulative volume size distribution (percent by volume associated with sizes less than or equal to a given size as a function of particle diameter), shows the size distributions before and after separation. The particle size of the abscissa in FIG. 10 is the diameter of a sphere with the same volume as the particle of interest, which can be referred to as the Coulter Counter size.

While the experiments with liquid droplets showed wall losses of almost 30% near the cutpoint size, the dry dust exhibited solid particle carryover and the particles were transported away from the critical zone.

The prediction of wall losses also partially explains why the cutpoint tended to shift to lower values using smaller S/W ratios. At smaller S/W ratio, the particles that travel close to the tube wall 20 get collected on the flow divider. With larger S/W ratios, these particles will be transported by the major flow.

Example 3H

Minor Flow Transmission Efficiency

Figure 11:
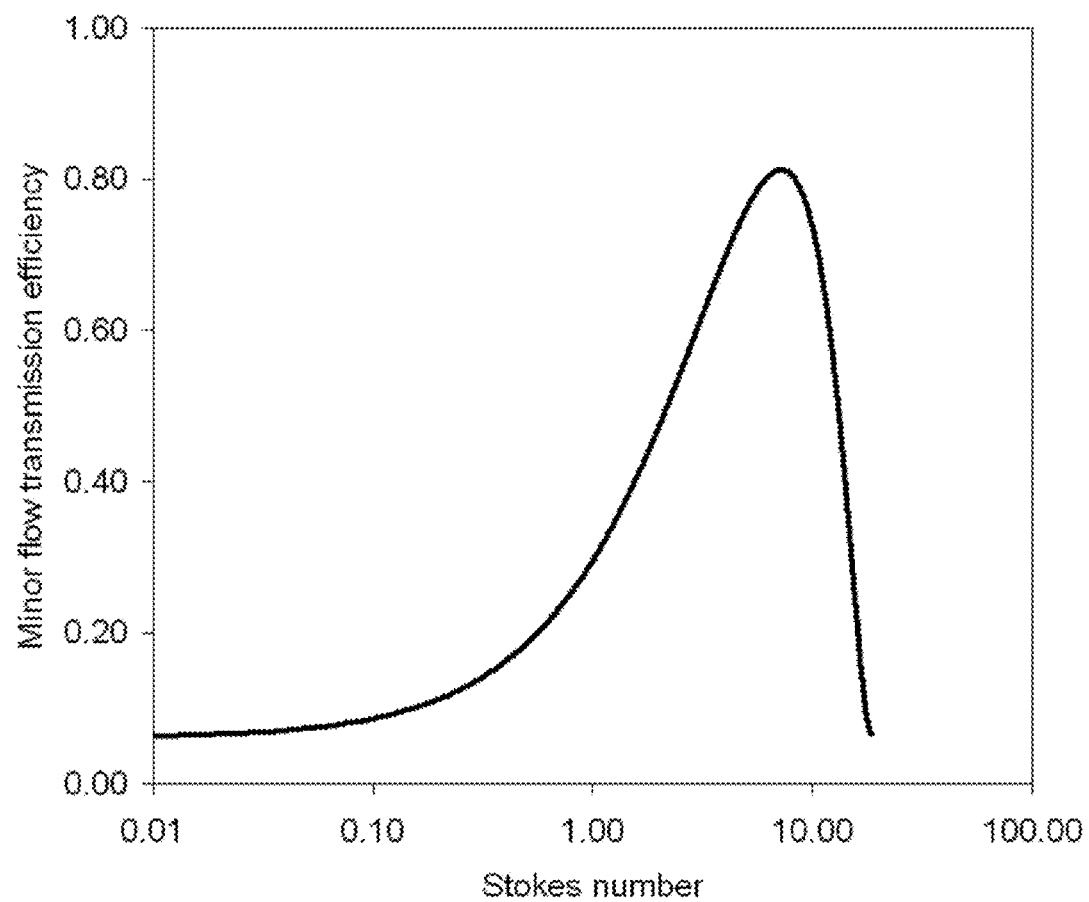
FIG. 11 is a plot of numerically predicted minor flow transmission efficiency as a function of Stokes number for an IVI according to an embodiment of the present disclosure having an S/W ratio of 1.75.

FIG. 11 presents the numerically predicted minor flow transmission efficiency as a function of Stokes number for an IVI-100 having an S/W ratio of 1.75.

The particle sizes represented by the Stokes numbers of the curve are as large as 50 µm AD. For the largest particles, inertia causes the particles to impact on the casing and this contributes to the drop in the transmission efficiency curve for larger particles. A small percentage of the particles (7% for a size of 10 µm AD) that enter the minor flow region get entrained in the recirculation region and are lost on the walls of the flow divider. If the IVI is to be used as a coarse particle concentrator, modifications to the critical zone geometry may be used to reduce wall losses.

Example 3I

Pressure Loss

The experimentally measured pressure drop across the IVI inlet for an inlet flow rate 90 of 111 L/min and a major exhaust flow rate 100 of 100 L/min and an S/W value of 1.75 was 45 Pa (0.18-inches of water). The corresponding numerical prediction is 46.1 Pa.

Example 3J

Effect of Alignment Spacers on Major Flow Transmission Efficiency

Figure 12:
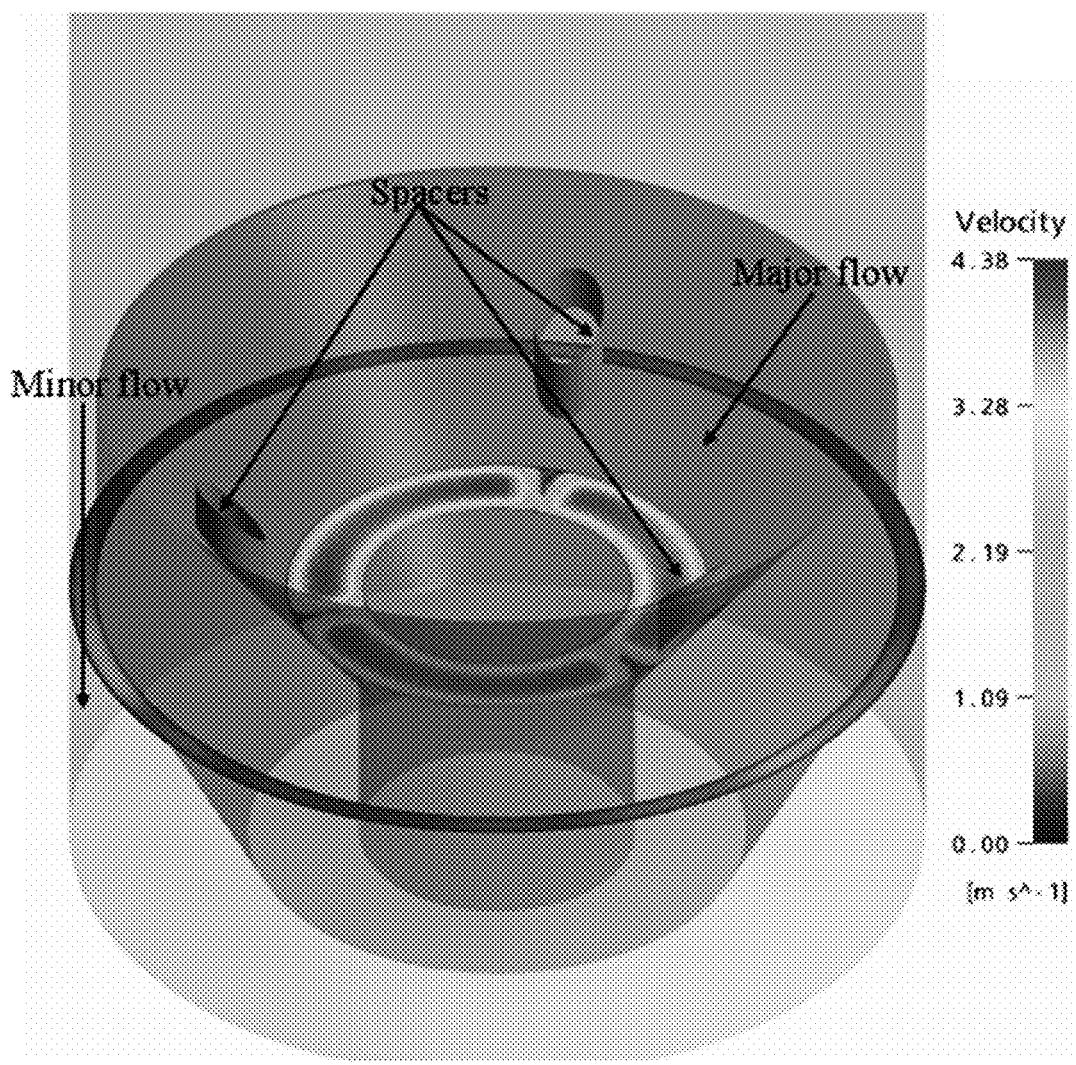
FIG. 12 is a three dimensional view showing velocity contours downstream of the alignment spacers of an IVI-100 according to an embodiment of this invention.

Particle deposition on the alignment spacers 70 in the major flow passage 61 was experimentally quantified to determine the impact of those losses on the performance of the device. For particles near the cutpoint size, only about 0.01% of the incoming aerosol was collected on the spacers 70. Deposition was also insignificant for particles beyond the cutpoint size as few of these particles are carried with the divided major flow in major flow passage 61. Thus it can be assumed that the presence of the alignment spacers 70 does not significantly influence the transmission efficiency. FIG. 12 is a three dimensional view showing velocity contours downstream of the alignment spacers 70 of an IVI-100 according to an embodiment of this invention. FIG. 12 illustrates the effect of the alignment spacers on the flow field in the annular plane located underneath the spacers toward the major flow exit. It can be seen that the disturbance is localized and does not affect the global flow. The effect of spacers on IVI performance is also illustrated by the results shown in FIG. 6, where the 2-D and 3-D performance simulations show substantial agreement. Alignment spacers 70 are not included in the 2-D simulations but are included in the 3-D geometry. The result that the two curves are nearly coincident also indicates that the spacers do not significantly impact IVI performance.

Example 3K

Effect of Minor Flow Ratio on Major Flow Transmission Efficiency

Figure 13:
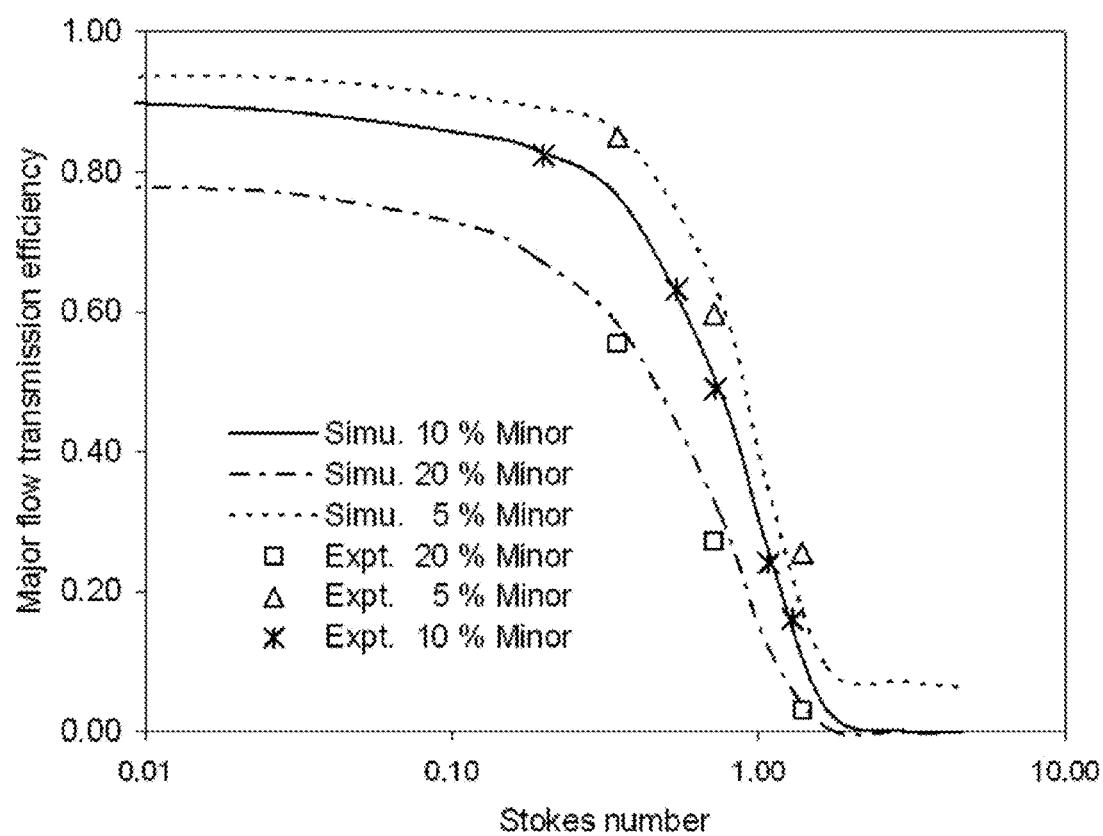
FIG. 13 is a plot of major flow transmission efficiency as a function of Stokes number for different minor flow rate ratios for an IVI of the present disclosure.

Virtual impactors typically operate at a 9:1 major to minor flow rate ratio (10% ratio of minor flow to inlet flow), which was also selected as the nominal design flow split for the IVI. However, performance changes that would result from the use of different flow ratios were studied, as this may allow a user to either vary the cutpoints without the need to modify any hardware, or to accommodate prescribed flow rates that do not result in the 9:1 split ratio. FIG. 13 is a plot of major flow transmission efficiency as a function of Stokes number for different minor flow rate ratios for an IVI of the present disclosure.

FIG. 13 shows a comparison of numerically calculated major flow transmission efficiencies, for 4:1 (20% minor flow), 9:1 (10% minor flow) and 19:1 (5% minor flow) major-to-minor flow rate ratios respectively. Results of both numerical simulations and physical experiments are shown in FIG. 13, with good agreement between the two approaches. The cutpoint Stokes number for the typical operational condition (10% minor flow) is 0.73, the cutpoint Stokes number for a 20% minor flow is 0.45, and for a 5% minor flow the cutpoint Stokes number is 0.90. With an increasing minor flow fraction, the cutpoint shifted to lower particle sizes because of an increase in the fraction of smaller particles inherently present in the minor flow. For particles with sizes larger than the cutpoint, the transmission efficiency curves tend to meld because inertial effects dominate. However, when just 5% of the flow is extracted through the minor flow, particles tend to lose their momentum and move back to the strong major flow, which results in heavy wall losses on the flow divider.

Example 3L

Mass Size Distribution Delivered by a Pre-Separator

The major flow particle transmission efficiency curve of an IVI is asymptotic to (1−f) at small Stokes numbers. Because this is unusual for a powder fractionator or aerosol pre-separator (although it is appropriate to a virtual impactor), an example is given on determining the cumulative mass size distribution of the fine fraction output aerosol. Assume that the IVI is used as a pre-separator for an inlet aerosol with a cumulative mass size distribution $G(D_a)$, where $G(D_a)$ is the fraction of aerosol mass associated with sizes $\leq D_a$. During a time interval $\Delta t$, the mass of aerosol, $\Delta m_i$, in the $i^{th}$ particle size interval of the discretized cumulative size distribution, which enters the IVI, is:

$$\Delta m_i = c_m Q_{tot} \Delta t \Delta G_i \quad (5)$$

where: $c_m$ is the aerosol particle mass concentration entering the IVI; $Q_{tot}$ is the air flow rate entering the IVI; $\Delta G_i = G(D_{a,i}) - G(D_{a,i-1})$; and, $D_{a,i}$ and $D_{a,i-1}$ are the right and left size boundaries of the $i^{th}$ particle size interval. The discretized cumulative mass size distribution function, $G(D_{a,j})$ of the inlet aerosol is:

$$G(D_{a,j}) = \sum_{i=1}^{j} \frac{\Delta m_i}{m} \quad (6)$$

where: n=number of particle size intervals, $$m = \sum_{i=1}^{n} \Delta m_i.$$

When $D_{a,j}$ is plotted, it is shown as the upper boundary particle size of an interval.

During that same time interval, $\Delta t$, the aerosol mass in the $i^{th}$ size interval that leaves the IVI through the major flow exhaust port, $\Delta m_{maj,i}$, is:

$$\Delta m_{maj,i} = T_{maj,i} \Delta m_i \frac{Q_{maj}}{Q_{tot}} = T_{maj,i} \Delta m_i (1-f) \quad (7)$$

where: $T_{maj,i}$ is the transmission efficiency (e.g., from FIG. 8) corresponding to the midpoint of the $i^{th}$ size interval; and, $Q_{maj}$ is the major air flow rate. The cumulative size distribution of the aerosol particles exhausted through the major flow port, is:

$$G_{maj}(D_{a,j}) = \sum_{i=1}^{j} \frac{\Delta m_{maj,i}}{m_{maj}} \quad (8)$$

$$\text{where: } m_{maj} = \sum_{i=1}^{n} \Delta m_{maj,i}.$$

As an example, suppose an IVI with an S/W ratio of 1.75, having the major flow transmission efficiency shown in FIG.

8, is designed to fractionate at a cutpoint size of 10 µm AD. The intake flow rate is 111 L/min and the major flow is 100 L/min, i.e., the minor flow rate ratio, f, is 10%. Assume the intake aerosol particles are log-normally distributed with a mass median diameter of 18 µm AD and a geometric standard deviation of 2.5, and further assume the mass concentration at the inlet of the IVI is 100 µg/m³.

Figure 14:
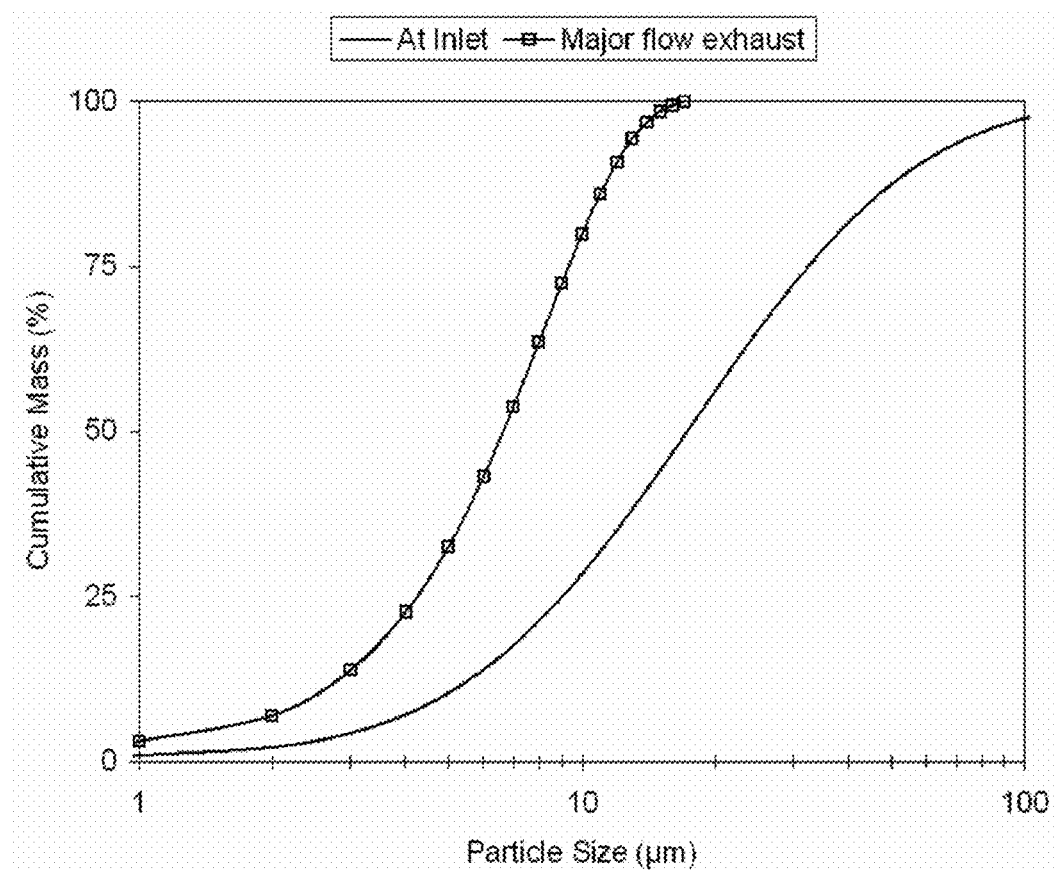
FIG. 14 is a plot of cumulative mass-size distribution of an aerosol that enters an IVI with a log-normal distribution having a mass median diameter of 18 μm AD and a geometric standard deviation of 2.5. The aerosol leaves the major flow exhaust port with a mass median of 7 μm AD.

For this example, the cumulative size distributions of aerosol particles at the IVI-100 inlet and at the major flow exhaust port are shown in FIG. 14, which is a plot of cumulative mass-size distribution of the aerosol particles.

Mass median diameter for the particles in the major flow outlet is 7 µm AD. In addition, the respective rates at which aerosol particles enter and leave the inlet and major flow outlet are 0.185 µg/s and 0.042 µg/s, respectively.

Example 4

Wind Tunnel Tests of BSI and Integrated BSI/IVI

Example 4A

Wind Tunnel Test Setup

Figure 15:
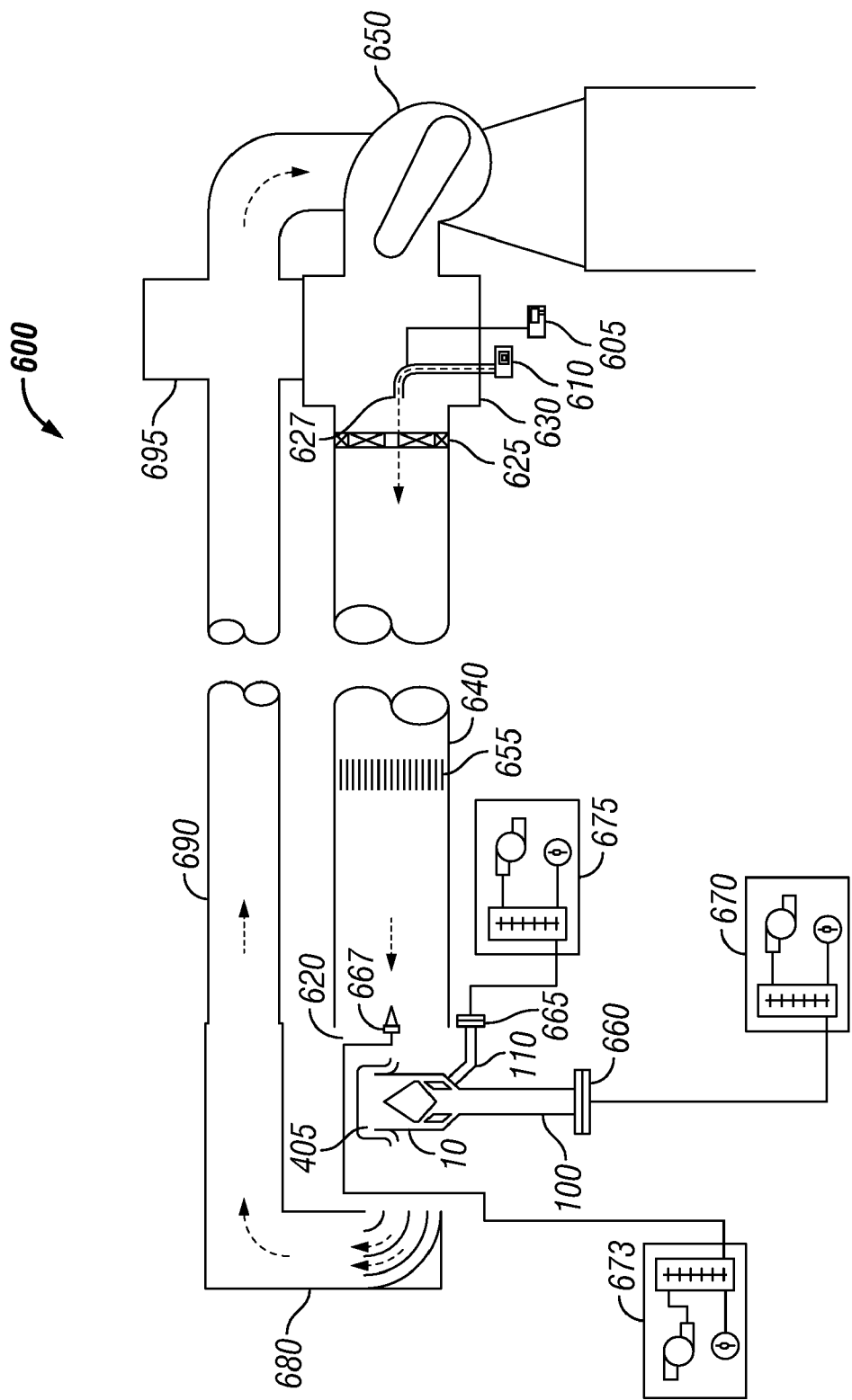
FIG. 15 is a schematic of the wind tunnel test setup of Examples 4A and 4B.

FIG. 15 is a schematic of a wind tunnel test setup 600 used to examine the performance of IVIs and BSIs according to the present disclosure.

Aerosol, output from a vibrating orifice aerosol generator 610 (VOAG, TSI Inc, Shoreview, Minn.), was passed through release point 627 within baffled chamber 630 and air blender 625 through wind tunnel 640 and flow straightener 655 to sampling location 620. Wind tunnel 640 had a diameter of 0.864 m. Sampled aerosol having a flow rate of 111 L/min, for IVI-100, and 444 L/min, for IVI-400, was extracted and drawn through IVI 10 and BSI 405. The IVI having the 100 L/min major flow is referred to as IVI-100, while the IVI having 400 L/min major flow is referred to as IVI-400. Aerosol sampling filters 660 and 665 were used to collect particles from the major flow 100 and the minor flow 110 respectively. The filters used were 47 mm, Type A/D glass fiber filters obtained from Pall Corp., East Hills, N.Y. Flow meters 670 and 675, respectively, were used to measure the flow rates of the major flow 100 (which was 100 or 400 L/min) and the minor flow 110 (which was 11 or 44 L/min).

Reference samples, used to characterize the aerosol concentration in the wind tunnel, were acquired by isokinetic (ISO) reference sampler flow control system 673 and ISO reference 667 for setup 600 of FIG. 15. For a given set of experimental conditions, at least triplicate samples were obtained. Recirculation duct 680, duct 690, and HEPA filters 695 were used to recirculate aerosol.

The aerosol particles were liquid droplets formed from atomization of an alcohol solution of oleic acid tagged with a fluorescent tracer (sodium fluorescein). The consistency of the aerosol being generated by VOAG 610 was monitored with aerodynamic particle sizer 605 (APS, TSI Inc, Shoreview, Minn.). The true size of the aerosol particles was determined microscopically. Droplet size was calculated from the microscopically-measured size adjusted for flattening of the droplets on a microscope slide according to the method described by Olan-Figueroa et al. (1982), but with a flattening factor of 1.29 (Thien, 2006) to take into account a different oil-phobic coating on the slides than that used by Olan-Figueroa. Density of the fluorescently tagged oleic acid was taken into account in converting the true droplet size to aerodynamic diameter.

Relative concentrations of aerosol in the test and reference samples were obtained by eluting the fluorescent dye from the test filters and analyzing the solutions fluorometrically (Turner Model FM109515, Quantech Barnstead International, Dubuque, Iowa). The filters were placed in a solution of 50% isopropyl alcohol and 50% distilled water (v/v) for at least four hours.

Example 4B

IVI Integrated with BSI

Figure 16:
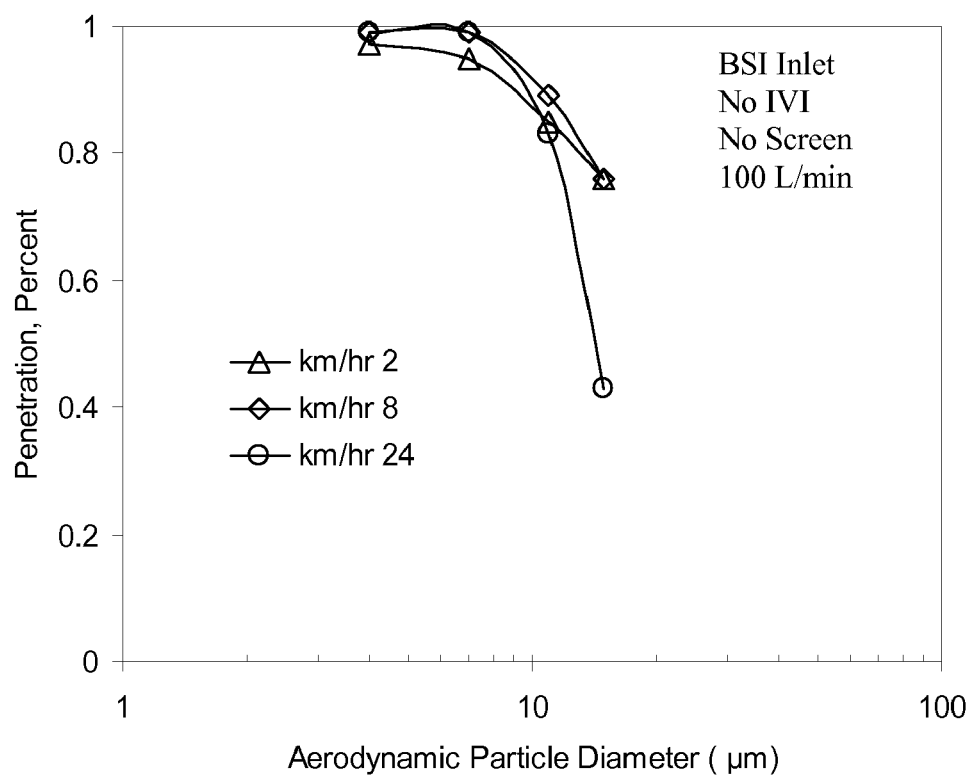
FIG. 16 is a plot of aerosol penetration as a function of aerodynamic diameter for the aspiration section of a BSI-100 operated at wind speeds of 2, 8, and 24 km/h. No screen or IVI were included in, or coupled to, the BSI-100 in this embodiment.

FIG. 16 is a plot of penetration of aerosol through the aspiration section of a BSI-100, according to an embodiment of the present disclosure, as a function of aerodynamic particle diameter (AD) for wind speeds of 2 km/h, 8 km/h, and 24 km/h. In this setup, there was no screen or internal fractionator (IVI) in the BSI-100, and the major flow rate was 100 L/min. The aerosol penetration, P, for a given particle size is defined as:

$$P = \frac{c_{a,ex}}{c_{a,in}} \quad (9)$$

where: $c_{a,ex}$ is the aerosol concentration at the exit of the aspiration section of a BSI; and, $c_{a,in}$ is the aerosol concentration in the bulk flow approaching the aspiration section.

The results in FIG. 16 show the penetration of aerosol particles with sizes less than or equal to 11 µm AD is at least 83% for all wind speeds. This suggests that the BSI-100 could be integrated with a pre-separator having cutpoint of 11 µm AD, and the overall system could provide a constant cutpoint of about 11 µm AD over the wind speed range of 2 to 24 m/h.

Tests of an integrated BSI-100/IVI-100, according to an embodiment of this disclosure, were conducted in the wind tunnel at wind speeds of 2, 8 and 24 km/h with the BSI-100/IVI-100 sampling bulk airflow at 111 L/min and exhausting a major flow rate of 100 L/min. For the integrated BSI/IVI, the major flow transmission for a given particle size is based on a comparison of the aerosol concentration in the major flow 100 and that in the wind tunnel as measured with isokinetic (ISO) reference samplers 667, i.e., the transmission efficiency, $T_{BSI/IVI}$, of the BSI/IVI combination is:

$$T_{BSI/IVI} = \frac{c_{maj}}{c_{o,in}}, \quad (10)$$

where $c_{maj}$ is the aerosol particle concentration in the major flow 100. FIG. 17 shows results of the testing, which are plotted with the transmission efficiency, $T_{BSI/IVI}$, as a function of aerodynamic particle diameter. The cutpoint of the integrated inlet system is 11 µm AD for all three wind speeds. The "standalone" entry in the legend of FIG. 17 identifies results from testing the IVI-100 in a fixture (FIG. 7) without the BSI. The cutpoint for the testing in the stand-alone mode is also 11 µm AD.

Figure 18:
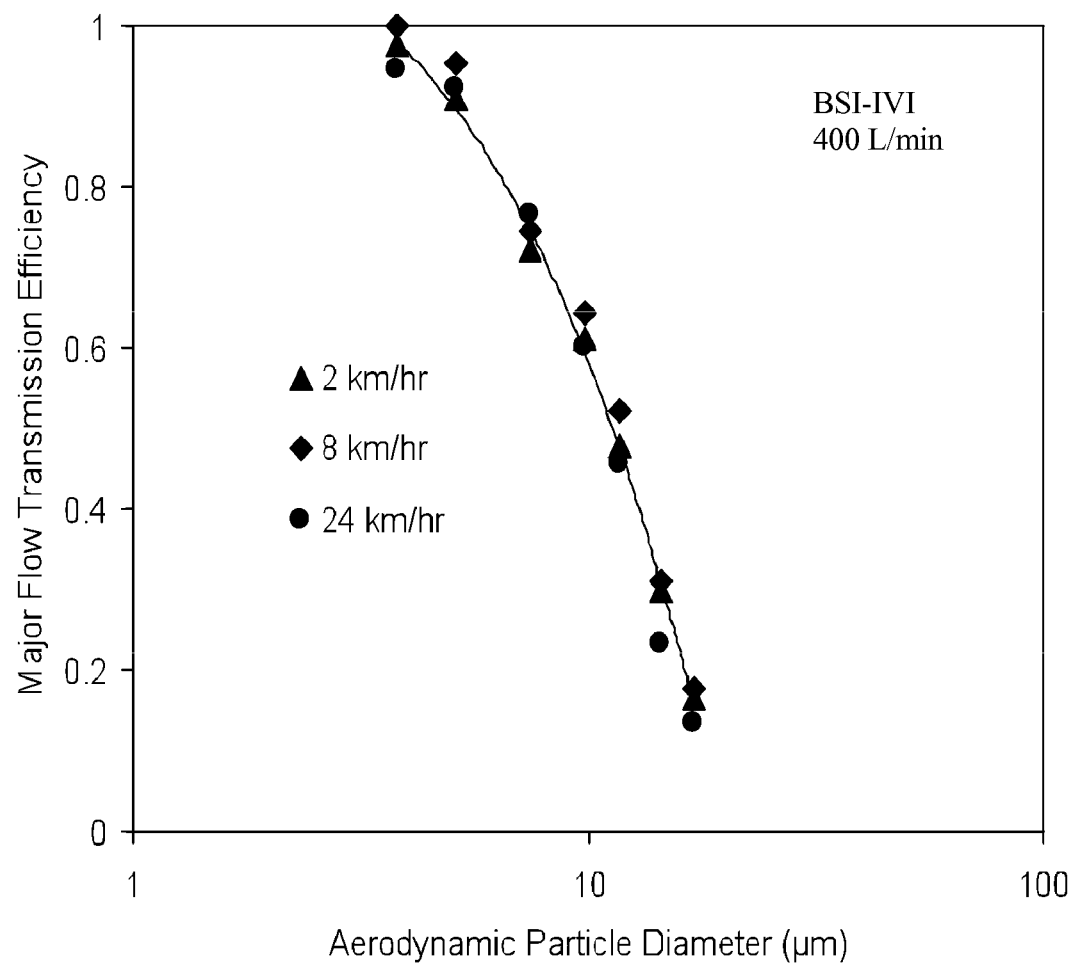

Wind tunnel tests were conducted with an integrated inlet system comprised of a BSI-100 and an IVI-400, according to an embodiment of this disclosure. FIG. 18 shows a plot of major flow transmission efficiency as a function of aerodynamic particle diameter for the integrated BSI-100/IVI-400 operated at a bulk flow sampling rate of 444 L/min and an exhaust major flow rate of 400 L/min. Performance at wind speeds of 2, 8, and 24 km/h was investigated, and the results in FIG. 18 show the cutpoint is 11.2 μm AD independent of wind speed.

Without further elaboration, it is believed that one skilled in the art can, using the description herein, utilize the present invention to its fullest extent. The foregoing embodiments are to be construed as illustrative, and not as constraining the remainder of the disclosure in any way whatsoever. While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, the relative dimensions of various parts, the materials from which the various parts are made, and other parameters can be varied. Accordingly, the scope of protection is not limited by the description set out above, but is only limited by the claims which follow, that scope including all equivalents of the subject matter of the claims. In the following discussion and in the claims, the terms "including" and "comprising" are used in an open-ended fashion, and thus should be interpreted to mean "including, but not limited to . . . ". Each original claim is incorporated into the specification as an embodiment of the invention. Thus the original claims are a further description and are an addition to the preferred embodiments.

The disclosures of all patents, patent applications and publications cited herein are hereby incorporated herein by reference, to the extent that they provide exemplary, procedural or other details supplementary to those set forth herein.

REFERENCES

ANSYS (2005). *CFX Release 10: User Manual.* Canonsburg, Pa., USA.

Ding, Y., Ferguson, S. T., Wolfson, J. M. and Koutrakis, P. (2001). Development of a High Volume Slit Nozzle Virtual Impactor to Concentrate Coarse Particles. *Aerosol Sci. Technol.* 34:274-283.

Haglund, J. S. and McFarland, A. R. (2004). A Circumferential Slot Virtual Impactor. *Aerosol Sci. Technol.* 38:664-674.

Hari, S., Hassan, Y. A. and McFarland, A. R. (2005). Computational fluid dynamics simulation of a rectangular slit real impactor's performance. *Nuclear Engineering and Design* 235:1045-1028.

Marple, V. A., Rubow, K. L., and Behm, S. M. (1991). A Micro-Orifice Uniform Deposit Impactor (MOUDI). *Aerosol Sci. Technol.* 14:434-446.

McFarland, A. R., Ortiz, C. A. and R. W. Bertch, J. (1984). A 10 μm Cutpoint Size Selective Inlet for Hi-Vol Samplers. *J. Air Pollut. Contr. Assoc.* 34:544-547.

Olan-Figueroa, E., McFarland, A. R. and Ortiz, C. A. (1982). Flattening Coefficients for DOP and Oleic Acid Droplets Deposited on Treated Glass Slides. *Amer. Ind. Hyg. Assoc. J.* 43:628-639.

Thien, B. F. (2006). Personal communications. Aerosol Technology Laboratory, Department of Mechanical Engineering, Texas A & M University, College Station, Tex.

Thompson, M. W., Donelly, J., Grinshpun, S. A., Juozaitis, A., and Willike, K. (1994). Method and Test System for Evaluation of Bioaerosol Samplers. *J. Aerosol Sci.* 25:1579-1593.

U.S. EPA. (1987). Revisions to the ambient air quality standards for particulate matter. *Federal Register* 52: 24,634-24,669.

What is claimed is:

1. An inline virtual impactor comprising:
   an outer housing having a housing inlet, a housing inner surface, a major flow outlet and a minor flow outlet;
   a flow accelerator member disposed in the upstream portion of the outer housing; and
   a flow stabilizer member disposed within the outer housing downstream of the flow accelerator member;
   wherein the disposition of the flow accelerator within the outer housing creates an annular flow passage between the flow accelerator and the outer housing, and wherein the inline virtual impactor is operable to separate a particle stream entering the housing inlet into a minor flow comprising primarily particles having a size greater than a cutpoint size and a major flow comprising primarily particles smaller than the cutpoint size;
   wherein the outer housing comprises a substantially cylindrical tube having a tube central axis and an inner cylindrical surface;
   wherein the flow accelerator member comprises an upstream apex pointing toward the housing inlet, a downstream base opposite the upstream apex, and an accelerator member central axis, wherein the downstream base is perpendicular to the accelerator central axis;
   wherein the accelerator central axis and the tube central axis are coincident;
   wherein the flow accelerator member substantially tapers inward from the downstream base to the upstream apex;
   wherein the flow stabilizer member comprises a stabilizer apex, a stabilizer base, an outer surface, and a stabilizer central axis; wherein the stabilizer base is perpendicular to the stabilizer central axis and the stabilizer apex is downstream of the stabilizer base and points away from the housing inlet.

2. The inline virtual impactor of claim 1 wherein the flow accelerator member comprises a bullet-shaped object.

3. The inline virtual impactor of claim 1 wherein the flow accelerator member is a cone.

4. The inline virtual impactor of claim 3 wherein the annular flow passage has a radial width that decreases with longitudinal position from the upstream apex to the downstream base.

5. The inline virtual impactor of claim 3 wherein the cone has a frustoconical outer surface and an upstream apex angle.

6. The inline virtual impactor of claim 5 wherein the upstream apex angle is about 60°.

7. The inline virtual impactor of claim 1, wherein the cutpoint Stokes number is between about 0.5 and about 1.1.

8. The inline virtual impactor of claim 7 wherein the cutpoint Stokes number is about 0.7 when the ratio of major flow rate to minor flow rate is about 9:1 and the aspect ratio is about 1.7.

9. The inline virtual impactor of claim 7 wherein the cutpoint Stokes number is between about 0.4 and 0.9 when the percentage of the flow which is minor flow is between about 20% and about 5%.

10. The inline virtual impactor of claim 7 further comprising at least one alignment spacer positioned between the flow stabilizer member and the flow divider, and wherein the cutpoint Stokes number may be adjusted by altering the aspect ratio by changing the height of the at least one alignment spacer.

11. The inline virtual impactor of claim 10 wherein the cutpoint Stokes number can be varied from about 0.4 to about 1 when the aspect ratio is varied from about 1 to 1.5 and the ratio of major to minor flow rate is held constant at about 9:1.

12. The inline virtual impactor of claim 1 wherein the stabilizer central axis, the accelerator central axis, and the housing central axis are coincident.

13. The inline virtual impactor of claim 12 wherein the flow stabilizer member substantially tapers inward from the stabilizer base to the stabilizer apex.

14. The inline virtual impactor of claim 13 wherein the stabilizer apex angle is about 90°.

15. The inline virtual impactor of claim 14 wherein the flow stabilizer member is a cone.

16. The inline virtual impactor of claim 15 wherein the stabilizer base and the accelerator base are the same base.

17. The inline virtual impactor of claim 16 further comprising a flow divider disposed within the outer housing downstream of the flow stabilizer member.

18. The inline virtual impactor of claim 17 wherein the flow divider comprises an inner surface facing but spaced axially apart from the flow stabilizer outer surface, a flow divider central axis, and a flow divider outer surface facing but spaced radially apart from the housing inner surface.

19. The inline virtual impactor of claim 18 further comprising at least one alignment spacer positioned between the flow stabilizer member and the flow divider.

20. The inline virtual impactor of claim 18 wherein the flow divider central axis, the accelerator central axis, the housing central axis, and the stabilizer central axis are coincident.

21. The inline virtual impactor of claim 18 further comprising an aspiration section through which an inlet stream to be sampled passes prior to introduction into the inline virtual impactor and wherein particles greater than an inlet removal size are removed from the inlet stream prior to introduction into the inline virtual impactor as the particle stream.

22. The inline virtual impactor of claim 21 wherein the aspiration section is substantially bell-shaped and comprises a bell-shaped outer housing comprising a lower inlet end, an inner housing comprising a lower inlet end; wherein the bell-shaped outer housing is spaced apart from the inner housing to define an inlet flow channel, and wherein the inlet flow channel is fluidly connected with an inner cavity disposed axially below an aspiration section cover.

23. The inline virtual impactor of claim 22 wherein the aspiration section further comprises a screen for the collection of particles greater than the inlet removal size.

24. The inline virtual impactor of claim 22 wherein the cutpoint particle size is 11 μm±3 μm aerodynamic diameter.

\* \* \* \* \*